(12) United States Patent
Farkas

(10) Patent No.: US 7,880,337 B2
(45) Date of Patent: Feb. 1, 2011

(54) HIGH POWER WIRELESS RESONANT ENERGY TRANSFER SYSTEM

(76) Inventor: Laszlo Farkas, 29 Taormina La., Ojai, CA (US) 93023

( * ) Notice: Subject to any disclaimer, the term of this patent is extended or adjusted under 35 U.S.C. 154(b) by 371 days.

(21) Appl. No.: 11/978,000

(22) Filed: Oct. 25, 2007

(65) Prior Publication Data

US 2008/0265684 A1    Oct. 30, 2008

Related U.S. Application Data

(60) Provisional application No. 60/854,673, filed on Oct. 25, 2006.

(51) Int. Cl.
 H01F 27/42  (2006.01)
 H01F 37/00  (2006.01)
 H01F 38/00  (2006.01)
(52) U.S. Cl. ....................................... 307/104
(58) Field of Classification Search ............. 307/9.1, 307/10.1, 104, 652; 320/108, 109
See application file for complete search history.

(56) References Cited

U.S. PATENT DOCUMENTS

| | | | | |
|---|---|---|---|---|
| 3,914,562 A | 10/1975 | Bolger | .......................... | 191/10 |
| 4,331,225 A | 5/1982 | Bolger | .......................... | 191/10 |
| 4,800,328 A | 1/1989 | Bolger et al. | .................. | 320/2 |
| 4,836,344 A | 6/1989 | Bolger | .......................... | 191/10 |
| 5,207,304 A | 5/1993 | Lechner et al. | ............... | 191/10 |
| 5,464,082 A * | 11/1995 | Young | .......................... | 191/2 |
| 5,559,420 A | 9/1996 | Kohchi | .......................... | 320/2 |
| 5,573,090 A | 11/1996 | Ross | .......................... | 191/10 |
| 5,621,654 A | 4/1997 | Cohen et al. | ................. | 364/493 |
| 5,669,470 A | 9/1997 | Ross | .......................... | 191/10 |
| 5,696,695 A | 12/1997 | Ehlers et al. | ................. | 364/492 |
| 5,968,680 A | 10/1999 | Wolfe et al. | .................. | 429/13 |
| 6,412,604 B1 | 7/2002 | Schuster | | |
| 6,803,744 B1 * | 10/2004 | Sabo | .......................... | 320/108 |
| 2004/0145342 A1 | 7/2004 | Lyon | | |
| 2008/0224670 A1 * | 9/2008 | Liu et al. | ........................ | 322/7 |

FOREIGN PATENT DOCUMENTS

WO    WO 9850993    11/1998
WO    WO 0054387    9/2000

OTHER PUBLICATIONS

International Search Report Dated: Jun. 13, 2008.
PCT Preliminary Report on related PCT application No. PCT/US2007/022709, dated: May 7, 2009.

* cited by examiner

Primary Examiner—Jared J Fureman
Assistant Examiner—Carlos Amaya
(74) Attorney, Agent, or Firm—Koppel, Patrick, Heybl & Dawson

(57) ABSTRACT

A high power wireless resonant energy transfer system transfers energy across an airgap.

40 Claims, 22 Drawing Sheets

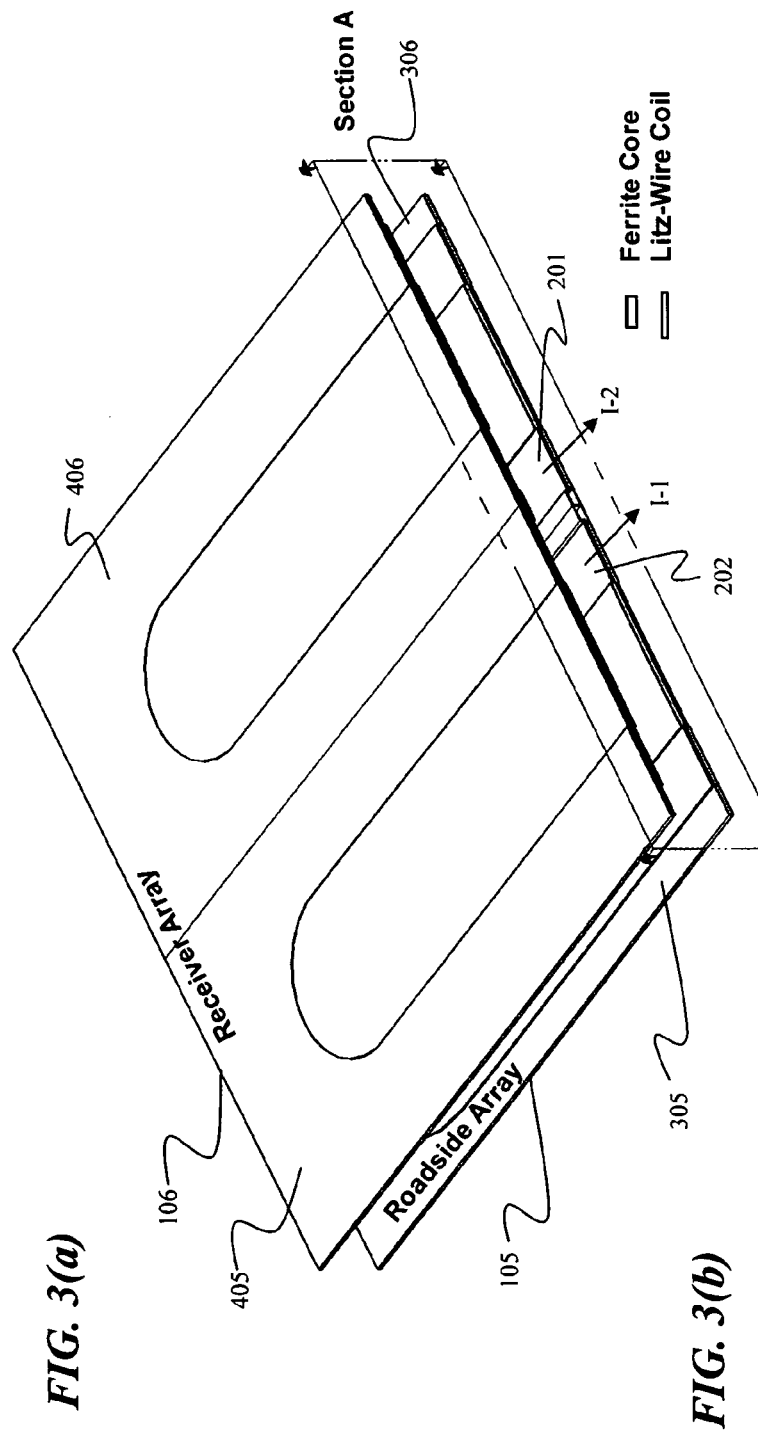
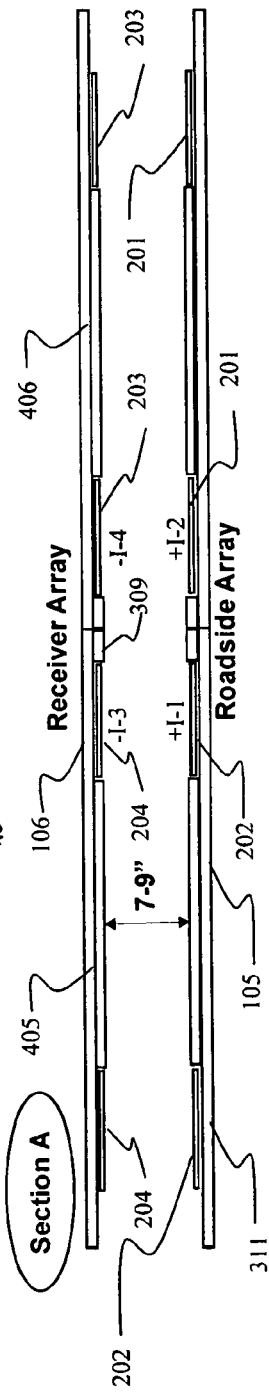
FIG. 3(a)
FIG. 3(b)

HIGH POWER WIRELESS RESONANT ENERGY TRANSFER SYSTEM

This application claims the benefit of provisional application No. 60/854,673 to Farkas filed on Oct. 25, 2006.

BACKGROUND OF THE INVENTION

1. Field of the Invention

This invention relates to a high power wireless resonant energy transfer system.

2. Description of the Related Art

Traditional electrical energy sources used to power vehicles and buildings typically rely on centralized production and a long-distance redistribution network of transmission lines to provide electrical energy to consumers. The centralized production of energy itself can be both inefficient (with only ~30-35% efficiency) and highly polluting. Additionally, most of the fossil fuels used for electric power generation produce waste heat at the power plants and in the transmission lines. This heat can be lost to the environment.

Although electric vehicles may help offset some of this pollution, as well as pollution caused by their gasoline counterparts, such vehicles must typically recharge their onboard batteries on a regular basis by physically plugging into an electrical source. Mass transit vehicles, such as electrically powered busses, vans and other higher occupancy vehicles, run continuously for extended periods of time, and hence require multiple recharges over shorter periods of time.

SUMMARY OF THE INVENTION

One aspect of the invention provides a high power wireless resonant energy transfer system, comprising an energy transmission system that is arranged to wirelessly transfer energy across an airgap. An energy reception system is positioned to receive the transferred energy across the airgap through a resonant inductive coupling between the transmission and reception system. The energy transmission system is arranged to automatically and electronically vary the spatial direction of the resonant inductive coupling with the alignment between the transmission and reception system, such that energy transfer occurs at a desired location, frequency and power level.

Another aspect of the invention provides a combined heat and power generation, comprising a local energy generation system that is arranged to generate and provide electrical energy for a local site and for an electrically chargeable vehicle in proximity to the local site, used in conjunction with the previously described high power wireless resonant energy transfer system.

Another aspect of the invention provides a method to wireless energy transfer that includes positioning an electrically chargeable vehicle within electromagnetic proximity of a transmitter, modulating a phase angle of an input signal to a transmitter to locate an optimal electromagnetic field distribution for energy transfer and auto-adjusting an energy transfer frequency based on a position of the energy receiver. Auto-adjusting of an energy transfer power is accomplished by modulating a pulse width of an input signal to the transmitter. The transmitter transfers energy to the receiver.

Another aspect of the invention provides a detachable E-pod, comprising a wheel assembly that is removably attached to a vehicle. A wireless energy reception system is arranged on the wheel assembly to receive wirelessly transmitted energy from an energy transmission system. A propulsion system comprising an electric motor is arranged on the wheel assembly and fueled by the wirelessly transmitted energy to move the vehicle. An electronic controller interface system is arranged to electrically connect the wheel assembly with the vehicle to control the propulsion system from the vehicle.

BRIEF DESCRIPTION OF THE DRAWINGS

FIG. 3($a$) is a perspective view and FIG. 3($b$) is a cross-sectional view showing one arrangement of a roadside and pick-up array.

FIG. 7($b$) is a graph presentation illustrating some typical vehicle charging power parameters during operation generated from actual test data obtained from a 100 kW energy transfer Test-Stand.

FIG. 18($b$) is a perspective view of a co-resonant wireless energy transmission system.

DETAILED DESCRIPTION OF THE INVENTION

Figure 1:
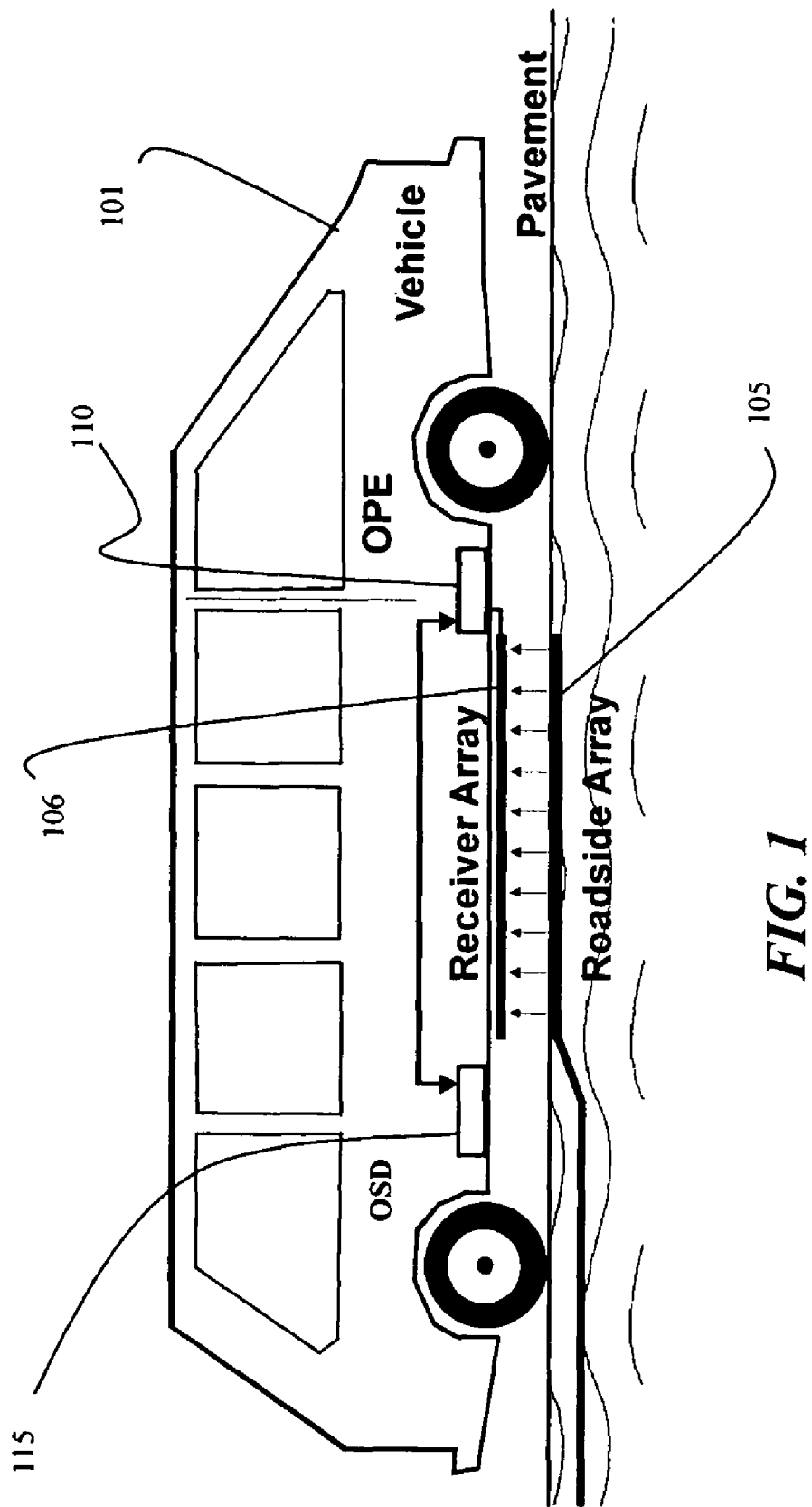
FIG. 1 is a diagram illustrating one embodiment of a high power wireless resonant energy transfer system that uses a roadside and pickup array to wirelessly transfer energy.

FIG. 1 illustrates one embodiment of a high power wireless resonant energy transfer system. This embodiment includes an energy transmission system 105 for wirelessly transmitting energy to an energy reception system 106 when the transfer system is activated.

The energy transmission system 105 is preferably disposed beneath a roadway surface, although transmission systems disposed on the surface are contemplated as well. The energy reception system 106 is preferably disposed on the undercarriage of a vehicle 101, which uses the transferred electrical power to either charge an onboard energy storage device unit 115 or for propulsion/use directly. The storage unit 115 typically includes a set of batteries and/or capacitors which store the energy until it is needed by the vehicle for propulsion. This storage and use is typically controlled by onboard power electronics 110. Although FIG. 1 shows a particular arrangement of this embodiment, other arrangements are also possible. For example, the energy transmission system 105 can be located above vehicle 101, rather than beneath a roadway surface, and the energy reception system 106 can be disposed on the top of vehicle 101. Additionally, the energy storage system 115 and onboard power electronics 110 may be disposed anywhere in or on the vehicle.

Figure 2:
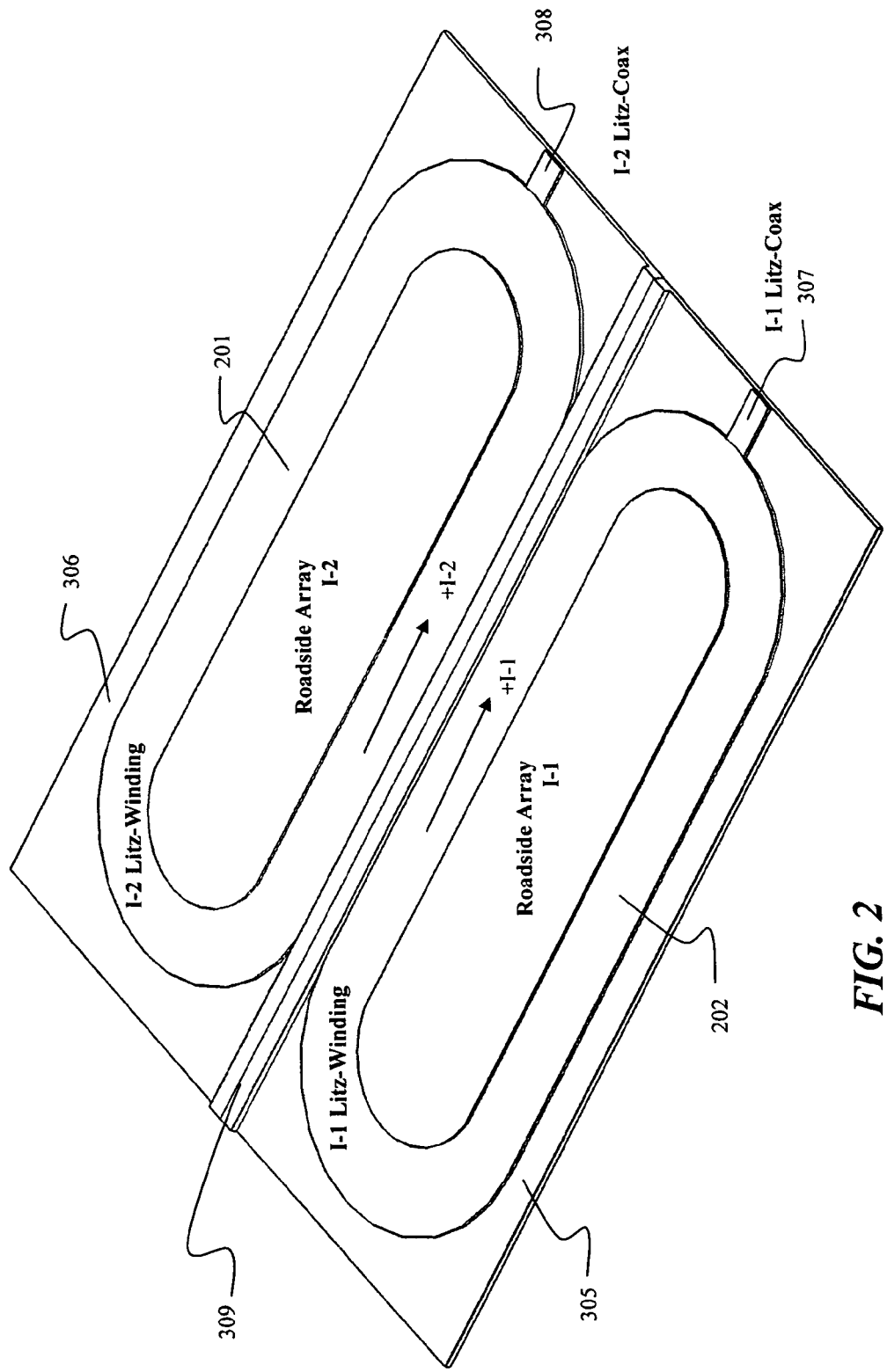
FIG. 2 is a schematic diagram showing a dual coil assembly array.

FIG. 2 illustrates an energy transmission system with a single flat magnetic assembly that includes ridge 309 that divides the single magnetic assembly into sections 305 and 306. Alternatively, two separate magnetic assemblies can be arranged adjacently to form sections 305 and 306 and ridge 309. The magnetic assembly is preferably a ferrite core magnetic diverter, and can be alternatively referred to as a magnetic core. Conductive coil windings 202 and 201 are preferably arranged within each section such that the top of the coil structure is preferably flush with the top surface of its respective magnetic assembly, although this is not required. Each coil structure 201 and 202 include input leads 308 and 307, respectively, for receiving input current. The magnetic assembly and pair of coil-windings together form a roadside array, or transmission array.

FIGS. 3(a) and 3(b) show one arrangement of the energy reception system 106, used in conjunction with the energy transmission system 105 of FIG. 2. Like the energy transmission system 105, the reception system 106 preferably has a flat magnetic assembly with ridge 309 that creates sections 405 and 406, as well as coils 203 and 204 arranged in each section 405 and 406. The reception system 106 is also known as a pick-up array, or reception/receiver array.

For both the transmission system 105 and the reception system 106, the coil windings are preferably multi-turn Litz-wire, which can help reduce any skin effects that can occur at the typical 20-30 kHz operational frequency. The Litz-wire coils are preferably wound flat into a composite material case, and are typically secured on the case of the magnetic cores 305 and 306 as one single assembly, though other assemblies are contemplated as well.

The magnetic cores are preferably tile-shaped low loss power ferrites with material composition optimized for 10-50 kHz power transformer application. The magnetic ridge between the coils sets the coupling coefficient between the adjacent coils. The pole face in the center of the coils improves the coupling coefficient between the transmitter and receiver magnetic assemblies. The assembly is preferably a 'flat magnetics' construction with less than 1" overall thickness for ease of roadway and vehicle installation.

During operation, the transmission system 105 and reception system 106 are preferably arranged such that the coils 201 and 202 of transmission system 105 face the coils 203 and 204 of the reception system 106 as shown in FIG. 3(a) and FIG. 3(b). FIG. 3(b) shows a cross section of the energy transmission and reception system in one arrangement used during operation. An airgap between transmission system 105 and reception system 106 separates the receiver and roadside arrays. This airgap may not be even, and the transmission and reception systems may not be aligned during typical operation. Despite the airgap and any potential misalignment, energy transfer from the transmission system 105 to the reception system 106 occurs due to resonant inductive coupling between the roadside and pick-up arrays.

Figure 4:
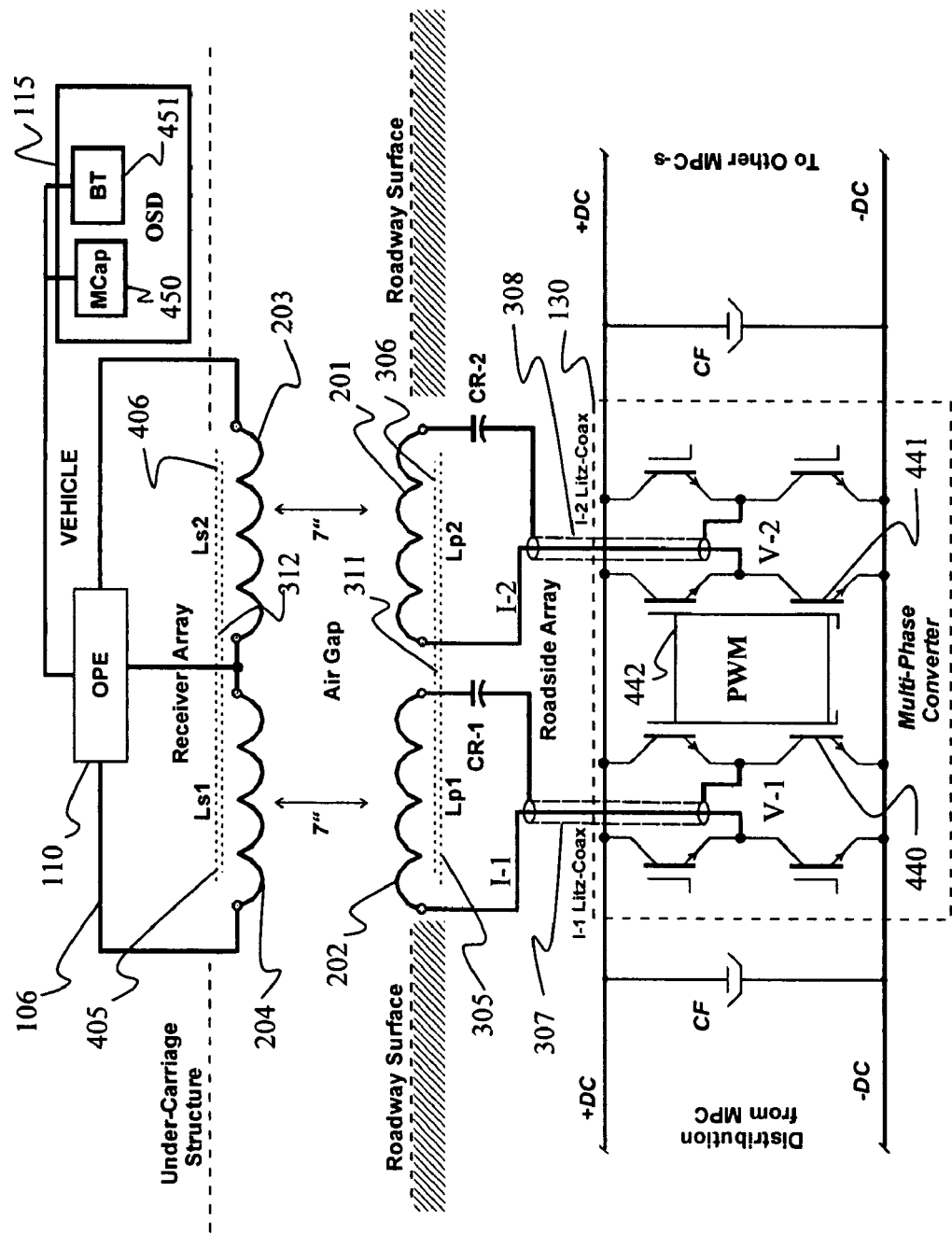
FIG. 4 is a schematic diagram illustrating resonantly inductive roadside and pick-up arrays.

FIG. 4 shows one example of a simplified circuit schematic that produces the resonant inductive coupling effects. Various other circuit details and elements are assumed, and not shown. The energy transmission system includes at least one roadside array, which comprises primary magnetic core windings Lp1 and Lp2. Lp1 includes coil winding 202 arranged in section 305 of a magnetic core, and Lp2 includes coil winding 201 arranged in section 306 of the same or adjacent magnetic core used in Lp1, as previously described. Lp1 and Lp2 are each also known as "primaries", "primary coils" or "primary windings".

The two primaries are connected to H-Bridge converters 440 and 441 of Multi-Phase Converter ("MPC") 130 through capacitors CR-1 and CR-2, as shown in FIG. 4. The combination of each primary winding and its capacitor forms a single resonant circuit. Because the coil winding 201 installed on core 306 and winding 202 installed on core 305 are coplanar and arranged next to each other, Lp1 and Lp2 inductively couple. Due to this coupling between the two primaries, the two series resonant circuits resonate at a common frequency when the primaries are simultaneously supplied with current by the MPC 130.

FIG. 4 also illustrates the energy reception system 106 that includes at least one pick-up array comprising magnetic core windings Ls1 and Ls2. Ls1 includes coil winding 204 arranged in section 405 of a magnetic core, and Ls2 includes coil winding 203 arranged in section 406 of the same or adjacent magnetic core used in Ls1. Ls1 and Ls2 are also coupled to each other in the same manner as the primaries. Ls1 and Ls2 are also known as "secondaries", "secondary coils", or "secondary windings".

When the secondary coils are brought within proximity of an energized set of primary coils, several coupling effects influence the overall flux coupling and hence the peak power of the energy transferred across the airgap. One coupling effect involves the secondary coils inductively coupling to the primary coils, thereby introducing an additional complex load to the otherwise undamped (high Q) series-resonant circuits formed by Lp1 and Lp2 and their corresponding capacitors. This additional complex load is typically caused by various elements connected to energy reception system 106, typically including the energy storage battery 451 and/or capacitor 450 of the vehicle, as well as other elements. Due to coupling between the secondary and primary coils, the resonant circuit of the energy transmission system experiences this complex impedance, and thus the circuit resonant frequency and quality factor (Q) change. The frequency change is detected by an auto-frequency tracking regulator which is part of the PWM electronics 442 that are part of Multi-Phase Converter 130. The auto-frequency tracking regulator is configured to synchronize the input H-Bridge 440 and 441 to switch relative to the zero-crossing time instances of the measured resonant current signal. Thus, the switching frequency is locked to the natural resonant frequency of the entire primary, secondary and load circuit. As the natural resonant frequency measured by the resonant current signal changes due to the load and airgap size variations, the input switching frequency is preferably locked to the natural frequency. The coupling distance is defined by the airgap between the energy transmission system 105 and the energy reception system 106. The natural resonant frequency typically varies by a few kHz due to the load and airgap. Thus, the peak power transferred over the airgap is affected. The power variation is regulated by the same PWM electronics which change the pulse width of the switching devices in H-bridge 440 and 441. In this manner, the peak power transferred is automatically adjusted to compensate for the size of the airgap and the secondary circuit's load.

Figure 7A:
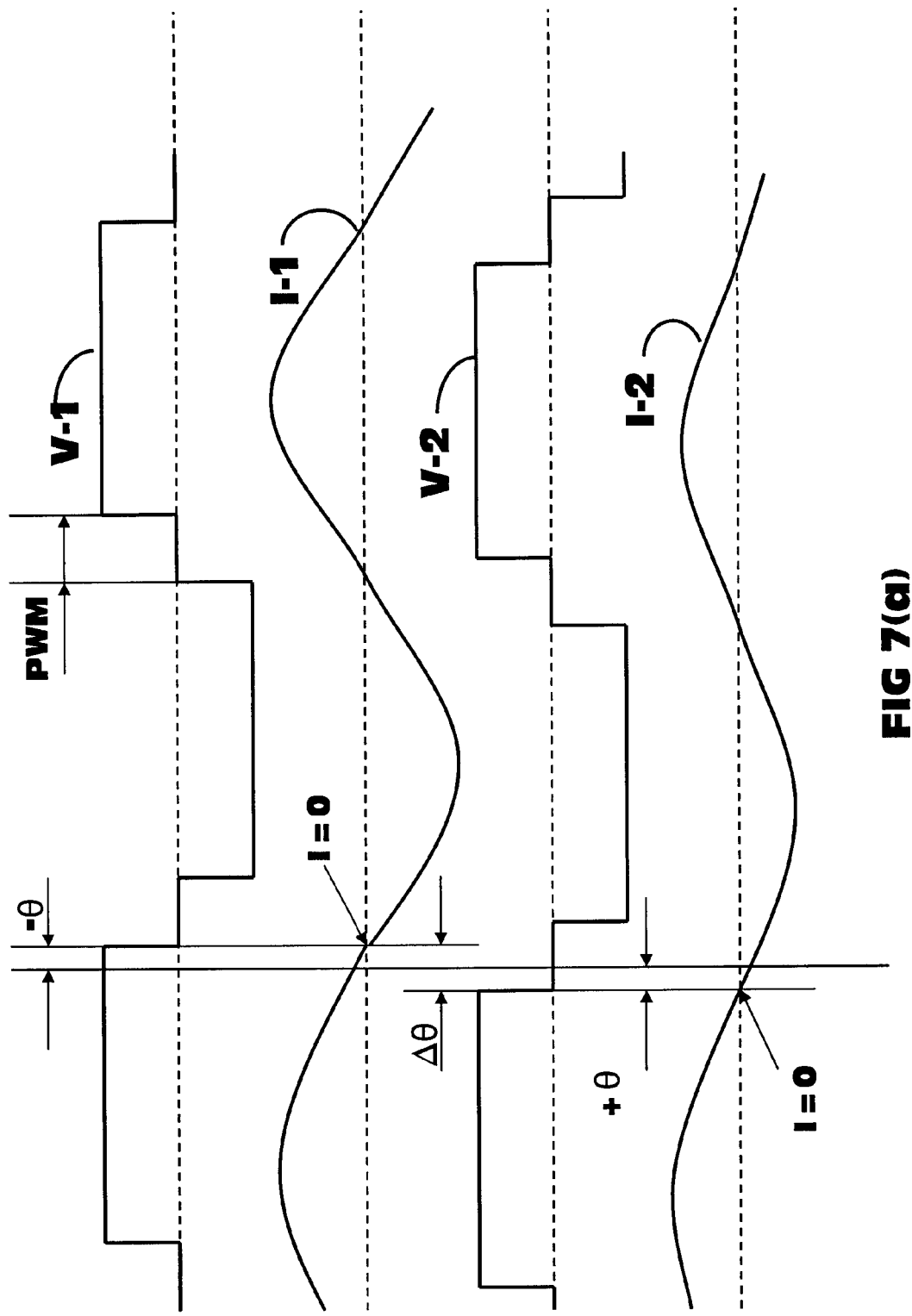
FIG. 7($a$) is a graphical representation of the voltage and current outputs of a multi-phase converter.
Figure 7B:
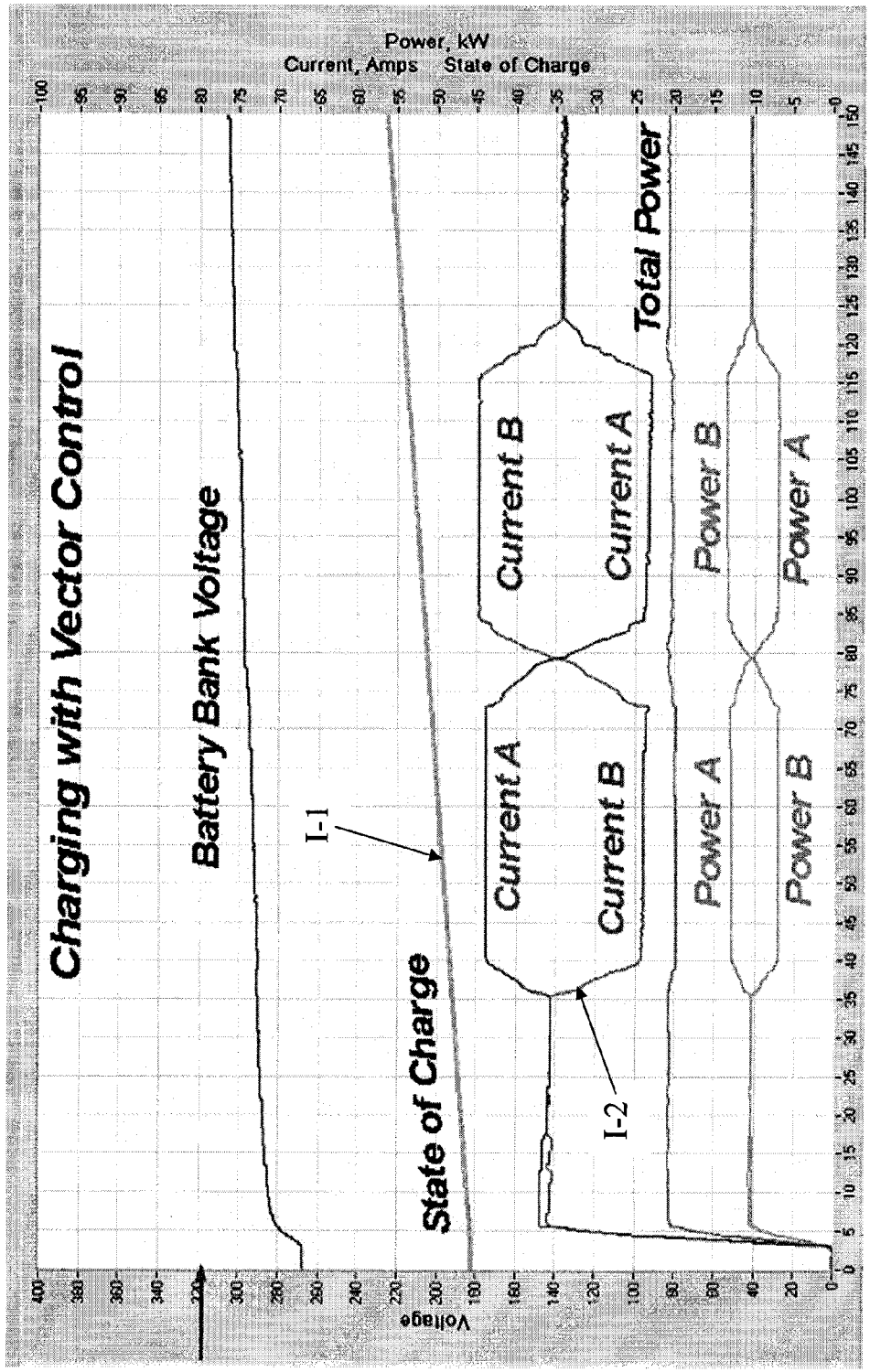

Another coupling effect that influences the peak power transfer is that which occurs between each of the primary coils and between each of the secondary coils. These couplings assure a common system resonant frequency for the pair of resonant circuits. The couplings also keep the relative current change in the primaries identical during directional phase-control. For example, as shown in FIG. 7(*b*), Current A increases and Current B decrease symmetrically during relative phase-control mode. The relative phase control between the pair primary resonant circuits is preferably accomplished by the PWM electronics.

Additionally, each of the primary coils cross-couples with each secondary coil, thereby contributing to the total inductance and to the coupling coefficient between the roadside and pickup arrays.

The described coupling effects combine to influence coupling coefficients between the different inductive elements and hence define the system's common resonance frequency and overall energy transfer capability. For large airgaps (7"-9"), the net coupling coefficient can be smaller (in the range of $K_c$=0.6-0.7), than in equivalent power transformers. Transferring energy over large airgaps in resonant mode may also require significant reactive/real power ratio in the resonant circuit, which can lower power transmission efficiency. Transmission of 100 kW power can be achieved over 7" airgap at 85% efficiency. Operating resonant frequency for this performance can be typically between 20-30 kHz. However, other airgap sizes, amount of power and frequency ranges are also contemplated.

Figure 5A:
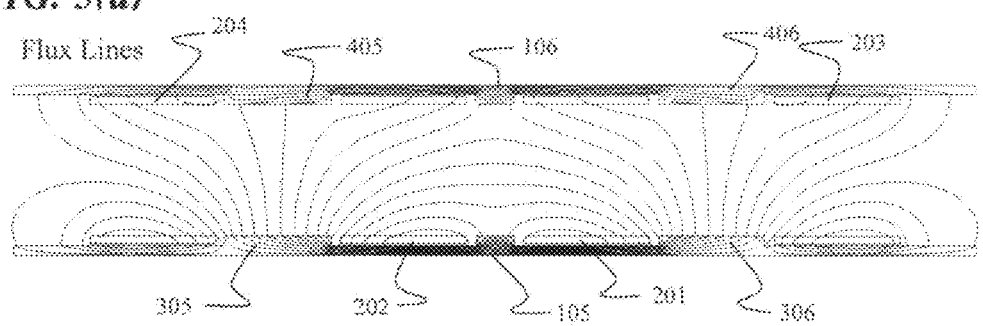
FIGS. 5($a$) and 5($b$) are diagrams showing an example of the magnetic flux performance of a wireless energy transfer magnetic structure.
Figure 5B:
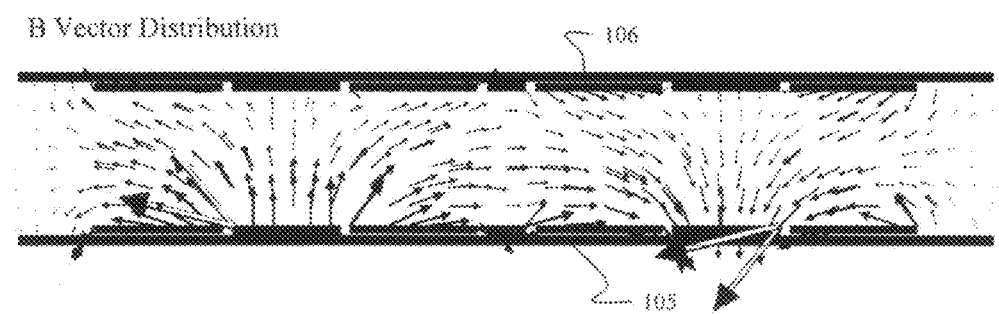

The desired location of the energy transfer itself is preferably along the central plane between energy transmission system 105 and energy reception system 106 shown in FIG. 3(*b*), or at least limited to the area between the transmission and reception systems. The currents supplied to the primary coils preferably flow in the same direction, as shown in FIG. 2, thereby causing the electromagnetic flux density to concentrate along the center axis of the roadside and pick-up arrays as shown in FIG. 5(*a*). As shown in FIGS. 5(*a*) and 5(*b*), the field density and location of energy transfer can concentrate beneath a vehicle center line and taper off along the edges. Residual stray field outside the envelope of the vehicle can thus be minimized.

Figure 6A:
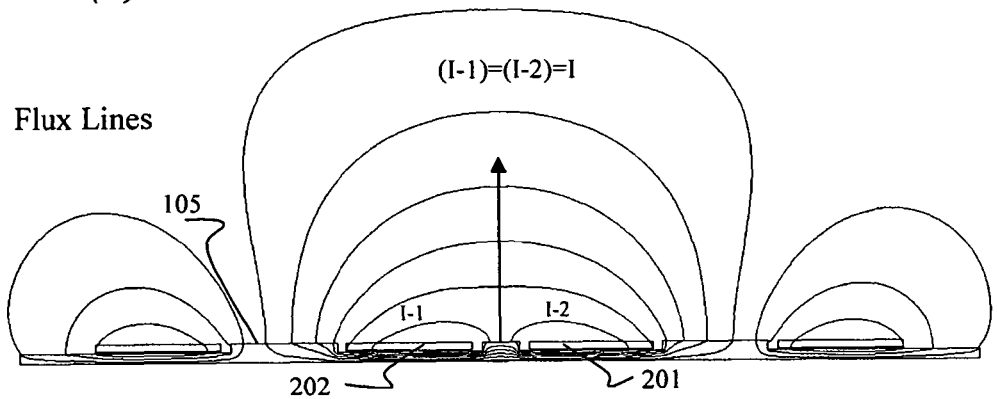
FIGS. 6($a$), 6($b$), and 6($c$) are diagrams showing the magnetic flux lines and directional gradient of an energy transmission system.
Figure 6B:
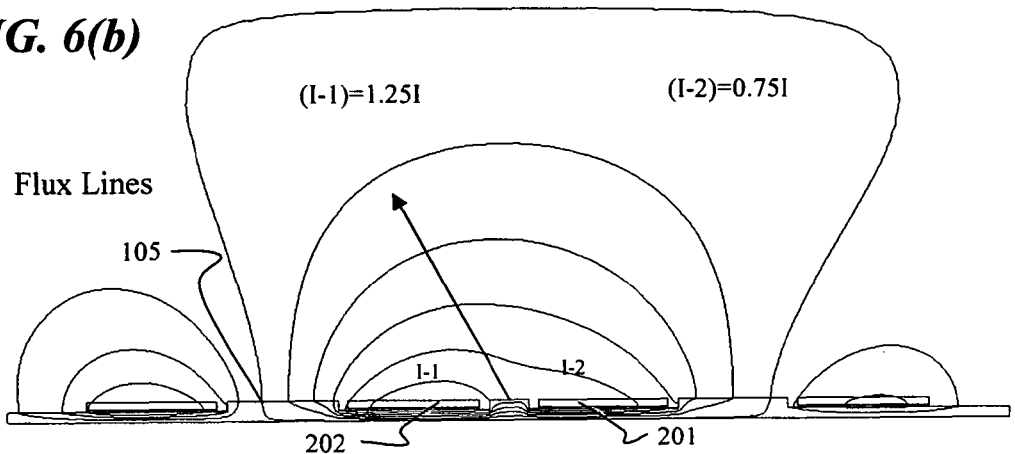
Figure 6C:
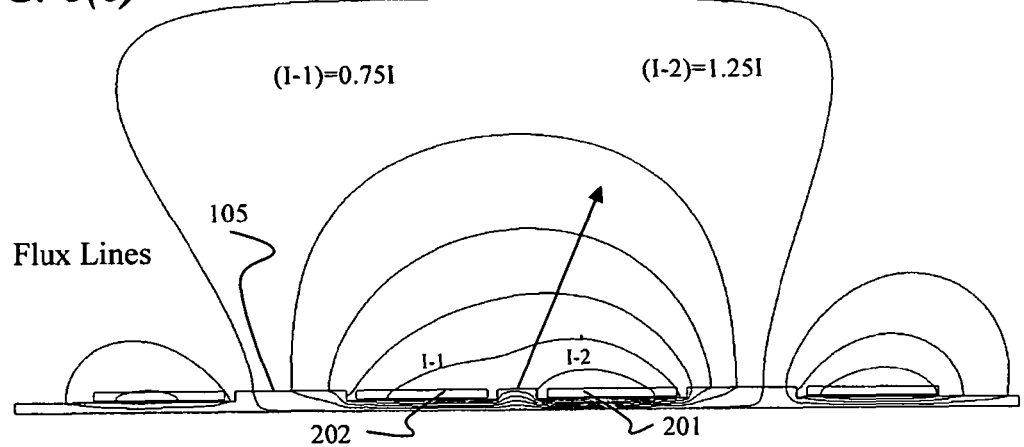
Figure 8A:
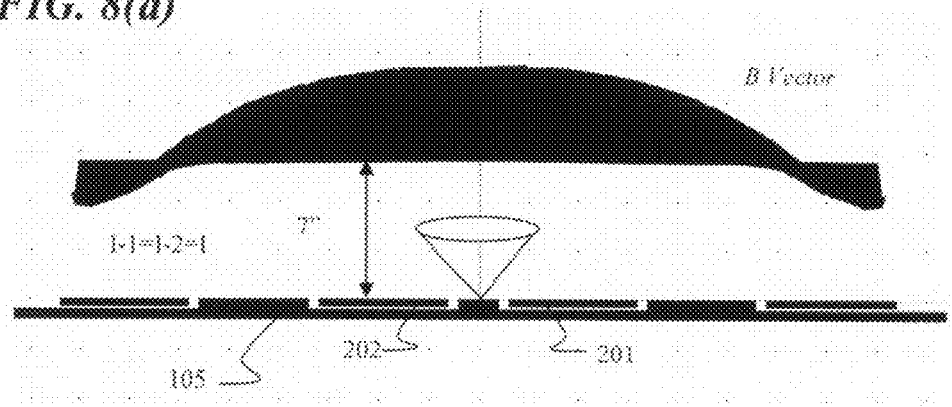
FIGS. 8($a$), 8($b$), and 8($c$) are diagrams showing magnetic field density vector gradients.
Figure 8B:
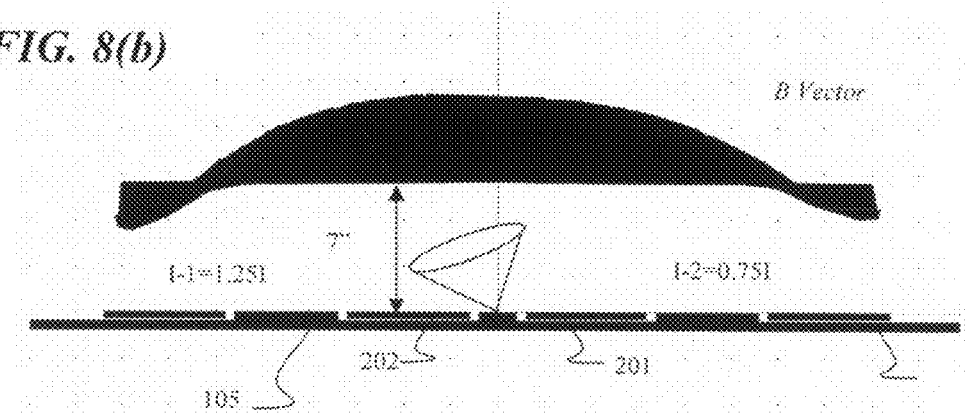
Figure 8C:
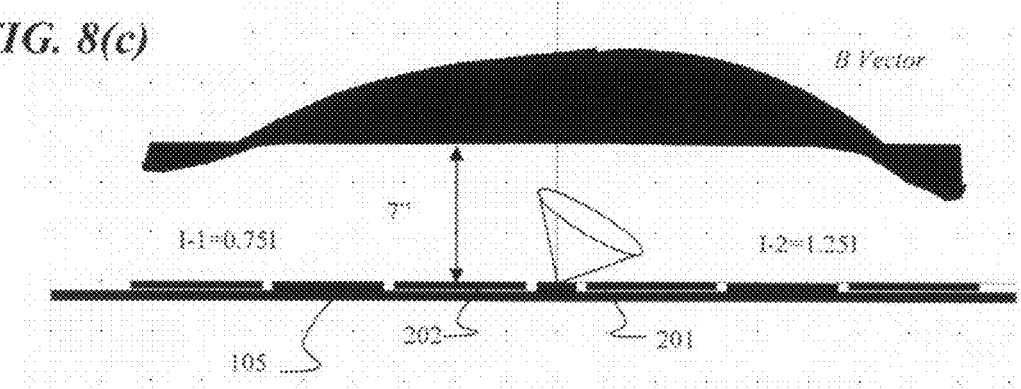

As shown in FIGS. 6(*a*), 6(*b*) and 6(*c*), the wireless transfer system can also automatically compensate for horizontal misalignment between the energy transmission system 105 and reception system by adjusting the spatial direction of the energy transfer. MPC 130 can perform this spatial direction adjustment by varying the relative phase angle between the input currents provided to the roadside array's primary coils 201 and 202 by switchmode single phase converters 440 and 441 (shown in FIG. 4). The phase converters generate a square wave bipolar output that can be used to excite the energy transmission system 105. The phase converters can be synchronized to the zero crossing of the resonant current, so that the excitation frequency trails the resonant frequency. When the resonant frequency changes due to a load introduced by the presence of secondary coils, these converters can follow the resonant frequency and thus maintain a high power factor for efficient real power transfer. For example, FIG. 7(*a*) shows an input PWM voltage and resonant current I-1 and I-2. The relative phase-angle between the driving voltages V-1 and V-2 can change the relative magnitudes of I-1 and I-2, which can produce the field gradient shift shown in FIGS. 6(*a*), 6(*b*) and 6(*c*) and FIGS. 8(*a*), 8(*b*) and 8(*c*). The gradient vector tilt can also produce the current magnitude variation in the outputs, causing the transferred power to also vary between the pair of receiver coils 203 and 204. However, the total power transferred preferably remains constant. Power in excess of 100 kW can be transferred over large air-gaps (7-9") at a frequency ranging from 20-30 khz. However, other airgap sizes, amount of power, and frequency ranges are also contemplated.

Figure 9:
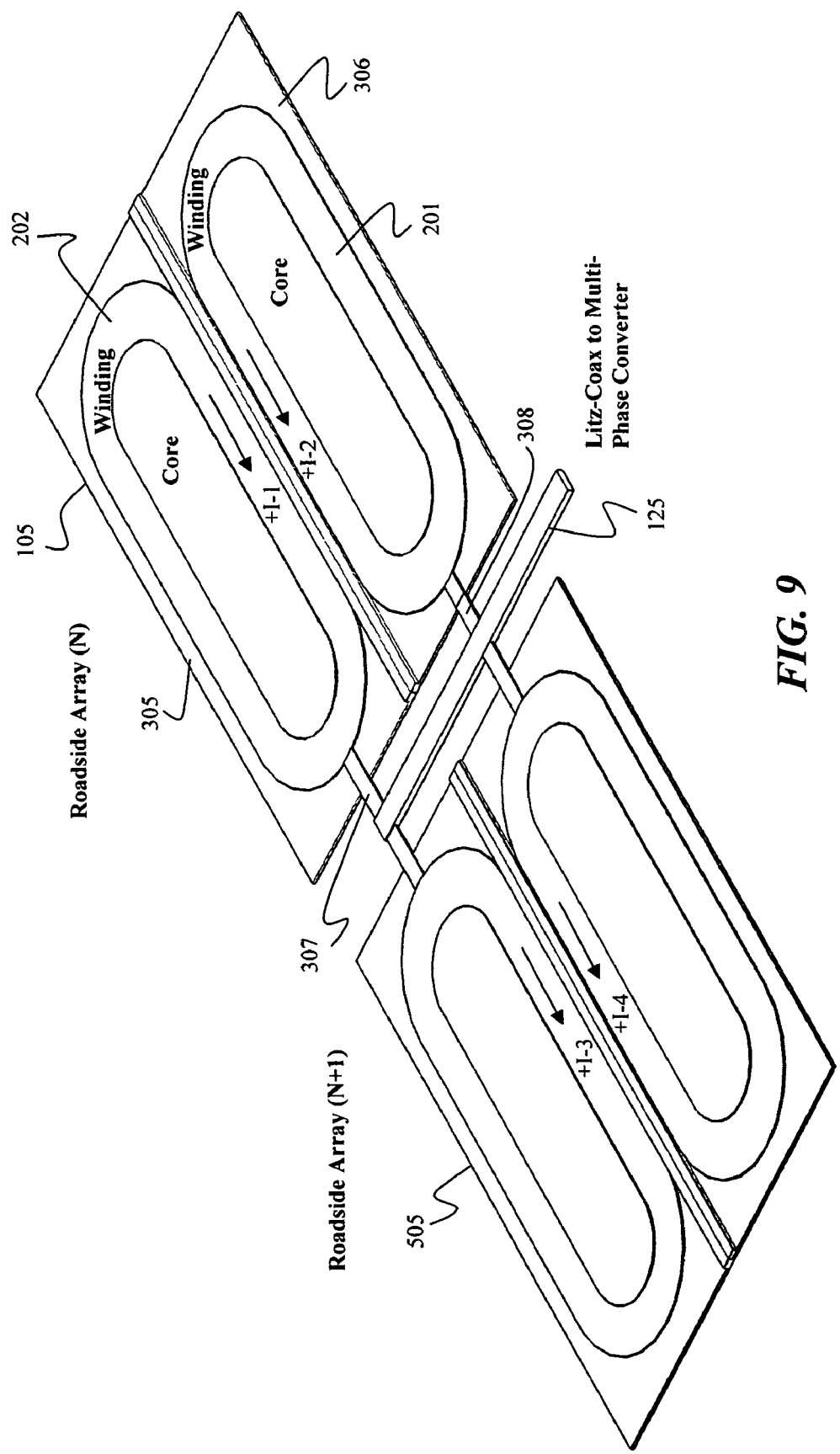
FIG. 9 is a schematic diagram showing a wireless energy transfer with multiple roadside arrays.

In another embodiment of the wireless transfer system, multiple roadside arrays can be arranged to provide an energy transfer system that can be used for larger vehicles. FIG. 9 shows one implementation of this embodiment, where an additional roadside array 505 can be added to increase the size of the energy transfer system. Directional control can be enhanced, since the electromagnetic field of each array can be spatially directed independently. Additionally, multiple pickup arrays can be used to receive wireless energy transfer ("WET") to power multiple loads independently. Roadside arrays 505 and 105 can both be connected to a multi-phase converter to receive current, which is preferably supplied so that the generated electromagnetic flux combines to transfer energy in the same direction.

Figure 10:
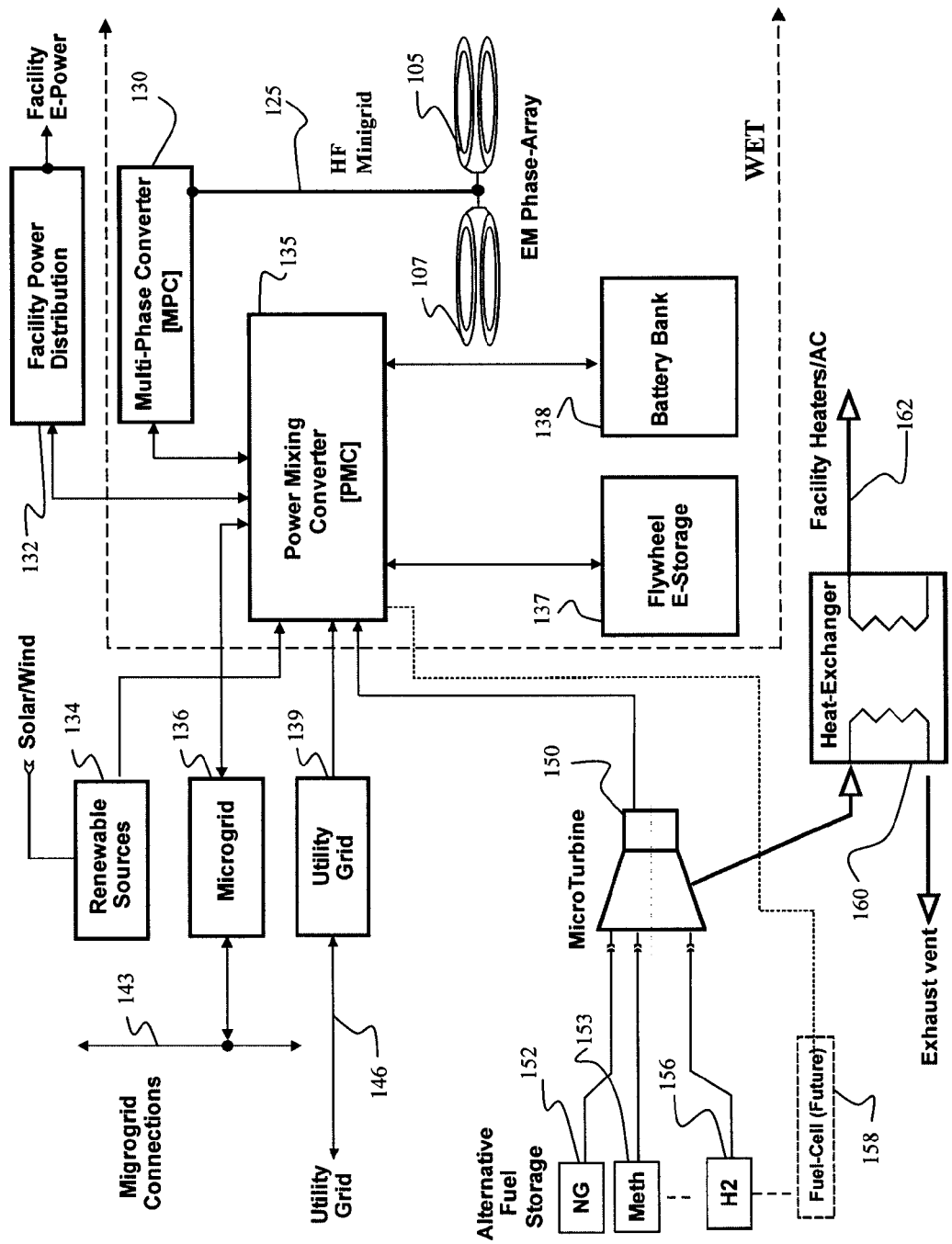
FIG. 10 is a schematic diagram showing a local energy generation system that can be used in conjunction with a wireless energy transfer system.

FIG. 10 shows another embodiment of the high power wireless resonant energy transfer system. This embodiment provides a local energy source that can power buildings and equipment at the local site and/or wirelessly transmit the generated energy to an electrically chargeable vehicle using the same or similar energy transmission 105 and reception system 106 discussed for the first embodiment.

In this embodiment, a Power Mixing Converter (PMC) 135 can receive energy from one or more sources, and can coordinate the distribution of that energy to one or more outputs. One source of energy includes one or more microturbine generator(s) 150, which can convert fuel from one or more fuel sources into energy. These fuel sources can include, but are not limited to, a methane source 153, natural gas source 152, and/or hydrogen source 156. The fuel sources are preferably stored on-site for convenience, but can also be transported in through pipe or by other means. Heat generated by the microturbine 150 can be captured in a heat exchanger 160, and can be used for heating and cooling needs at the site, such as warming water, or driving a turbine to provide additional electrical power to the site.

Other energy sources for the PMC 135 can include energy from renewable sources 134, such as solar and wind power. PMC 135 can also receive energy from other sites connected through microgrid 136 and from the standard utility grid 139, as well as one or more on-site energy storage units, such as flywheel(s) 137, and/or one or more battery banks 138. The PMC 135 can select its energy source(s) based on a variety of factors, including, but not limited to source availability, storage capacity and real-time costs of each of the energy sources.

In addition to receiving energy from one or more sources, the PMC 135 can also distribute energy to one or more outputs. These outputs include, but are not limited to, the site facility power distribution system 132 for powering the site itself, one or more flywheel storage banks 137 and battery banks 138 for load leveling and backup power, the microgrid 136 for powering other sites, the standard utility grid 139, and the MPC 130 for wirelessly transferring the energy to an electrically chargeable vehicle through arrays 105 and 107. The PMC 135 can also calculate which output to send the energy to. For example, during low load periods, the PMC 135 may choose to output energy to the fly-wheel storage 137 or battery bank 138 for storage. During peak load periods, the PMC 135 can draw power from the fly-wheel storage 137 and/or battery banks 138 to provide load-leveling. PMC 135 can determine its energy source and outputs either in real-time or by using past data. Thus, the PMC 135 can optionally calculate energy trends over a period of time, and even optionally anticipate and adjust for energy supply and demand. Typical PMC 135 energy transfers can involve between 250 kW to 2 MW of power.

Another embodiment of the high power wireless resonant energy transfer system includes providing an electric vehicle with the transmission reception system 106 of the previous embodiment, onboard power electronics (OPE) 110, and onboard energy storage device (OSD) 115, as shown in FIG. 4. The OPE 110 preferably can rectify an input AC voltage from the wireless reception system 106, and can supply the output DC current to the OSD 115. The OSD 115 comprises a battery bank 451 preferably capable of storing at least five miles of propulsion energy (typically 10 kWh for a 40' bus) and a mega-capacitor (MegaCap) 450 capable of providing sufficient energy to accelerate the vehicle and receiving the initial charging current surge from the wireless transmission system. A steering inverter (not shown) within the OPE can be arranged to control the power flow into and out of battery bank 451 and mega-capacitor 450. In another embodiment, the OPE is configured to invert power back to the roadside energy storage through providing PWM power to the secondaries drawn from the OSD. The primary resonant circuit can feed the resonant current back to the DC bus through the H-Bridge converters operating in rectifier mode. In this embodiment the vehicle can operate as an emergency or standby power source for site equipment. Preferably, the battery bank 451 comprises batteries made of NiMH or Li-Ion, but other types of energy storage devices are contemplated as well.

Figure 20:
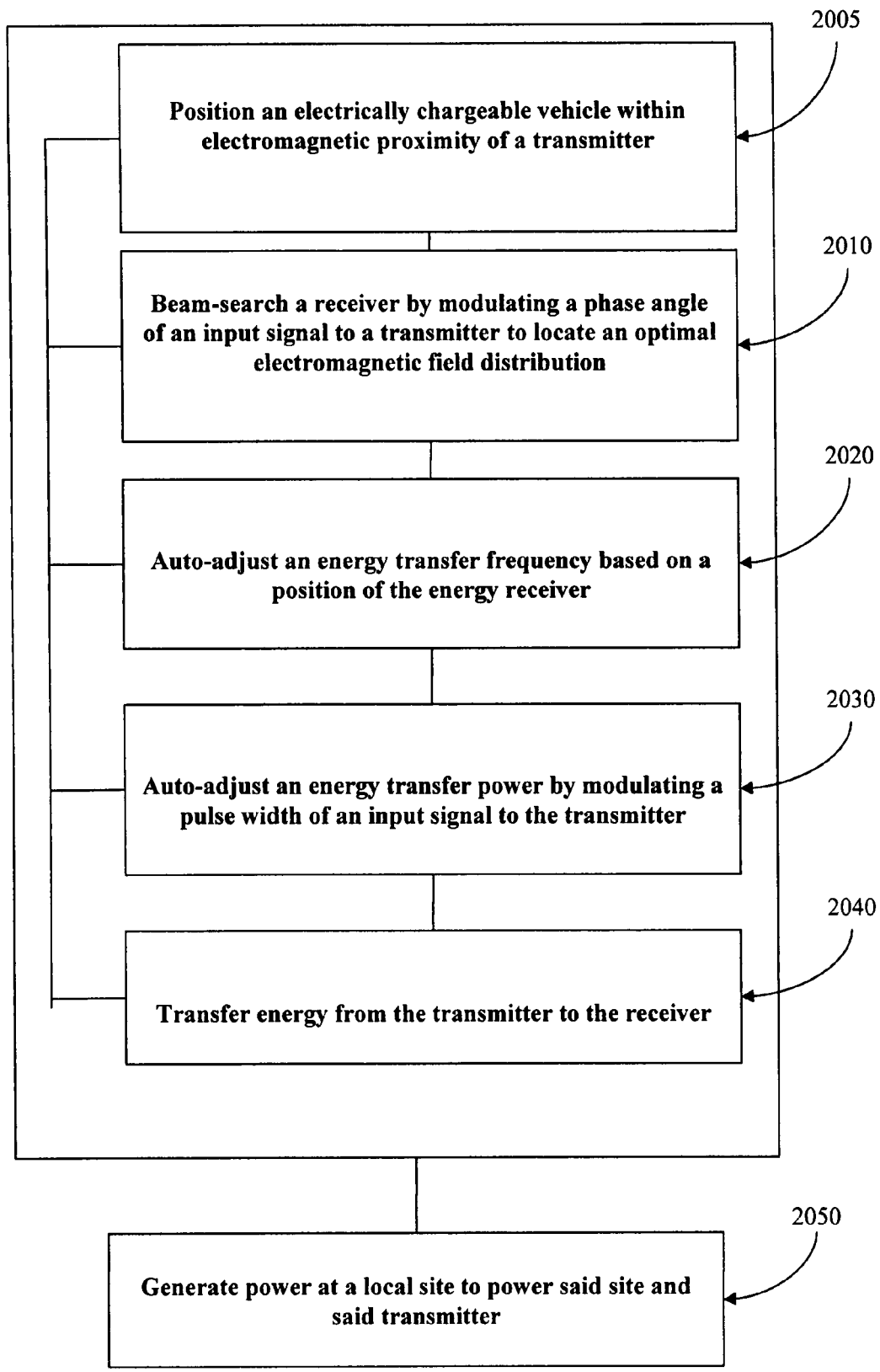
FIG. 20 is a flow diagram showing a method for wireless energy transfer.

Another embodiment of the high power wireless resonant energy transfer system shown in FIG. 20 provides a method for wireless energy transfer, comprising positioning an electrically chargeable vehicle within electromagnetic proximity of a transmitter. A beam-searching of the receiver can be performed by modulating a phase angle of an input signal to a transmitter to locate an optimal electromagnetic field distribution. Typical beam-searching modulation is shown in FIG. 7(*b*), where Current A (I-1) and Current B (I-2) symmetrically modulated in both directions, and then return to the center position. An auto-adjustment of an energy transfer frequency based on a position of the energy receiver can be accomplished. An auto-adjusting of an energy transfer power can be performed by modulating a pulse width of an input signal to the transmitter. Energy can be transferred from the transmitter to the receiver. Additionally, power can be generated at a local site to power the site and the transmitter.

Another embodiment of the wireless transfer system provides for activating the energy transfer system shown in FIG. 1. This embodiment uses the same wireless transmission and reception system described in the first embodiment. As vehicle 101 approaches transmission system 105, its onboard computers can send a signal to activate the energy transmission system 105. This signal is preferably sent automatically, and may be encrypted. As the vehicle 101 comes to a rest over transmission system 105, transmission system 105 can transmit an electromagnetic beam to search for the position of the reception system 106. Once transmission system 105 determines the location of the reception system using the electromagnetic beam sweep, it automatically adjusts the location of the energy transfer to maximize the transfer.

Another embodiment of the high power wireless resonant energy transfer system provides an E-pod and an electric highway for continuous electrical propulsion power for heavy highway vehicles, such as cargo trucks and 40'-60' rapid transit buses. In this embodiment, an energy reception system can be mounted to the undercarriage of a vehicle to collect power from a series of road-surface energy transmission systems that have transmission arrays. The activated transmission arrays directly under the vehicle can provide most of the vehicle's propulsion energy. Thus, the vehicle needs only a small energy storage onboard. The roadway transmission arrays are preferably active for the short period of time required for the vehicle to pass over the array. Thus, the output power transmitted can be high but the duty cycle is small. The pickup coils of the moving vehicle, however, see a practically continuous power-rail.

Figure 11:
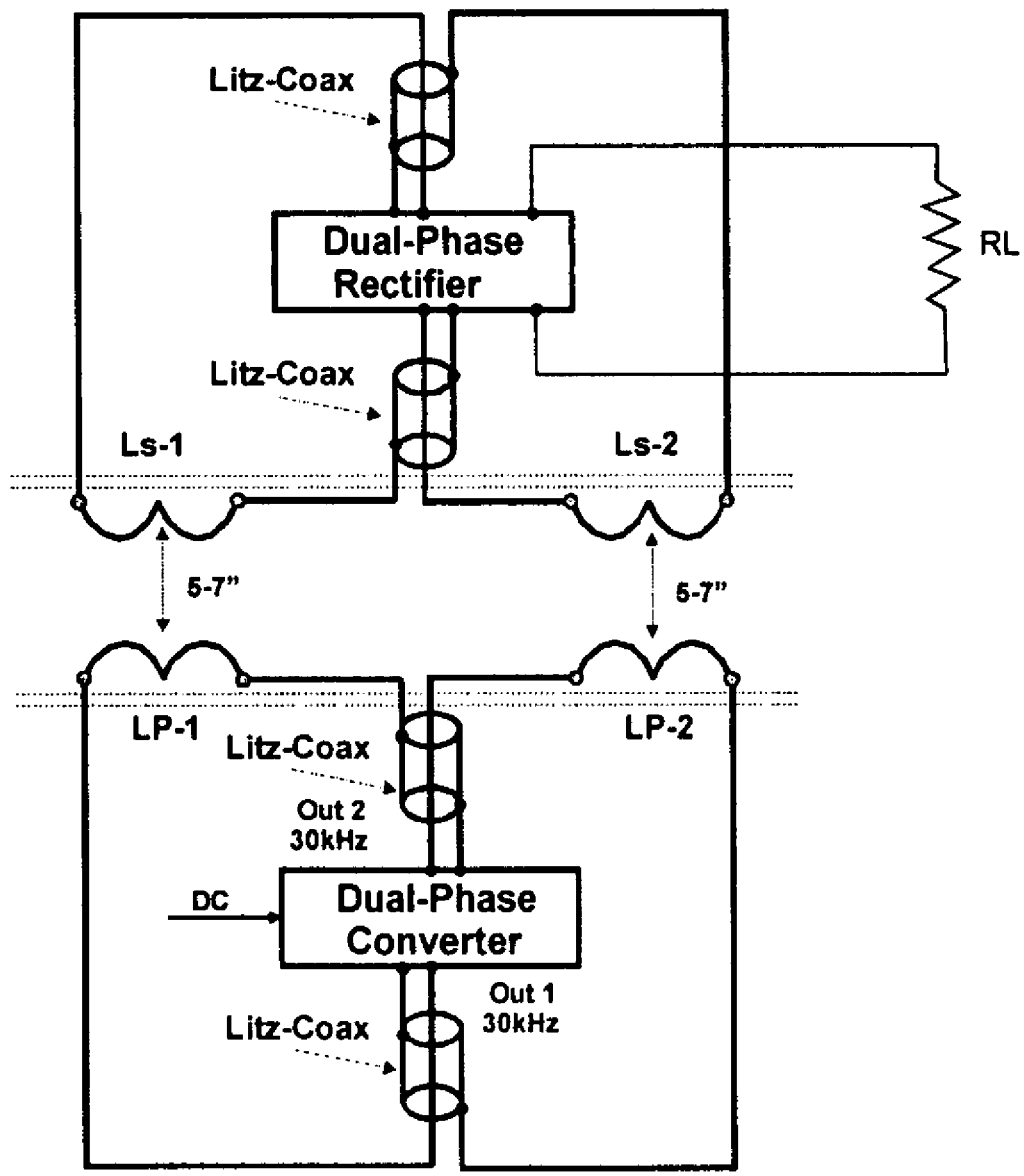
FIG. 11 is a schematic diagram showing an electrified highway lane wireless energy transfer power equivalent circuit.

The equivalent circuit schematic diagram in FIG. 11 shows a typical dual coil arrangement for the roadway magnetic pad. The Dual-Phase Converter drives LP-1 and LP-2 coil segments such that the currents oppose each other in the return path. The coils are preferably on the top surface of the magnetic core, and the coaxial returns are underneath with the Dual-Phase converter packaged into the roadway assembly.

Figure 12A:
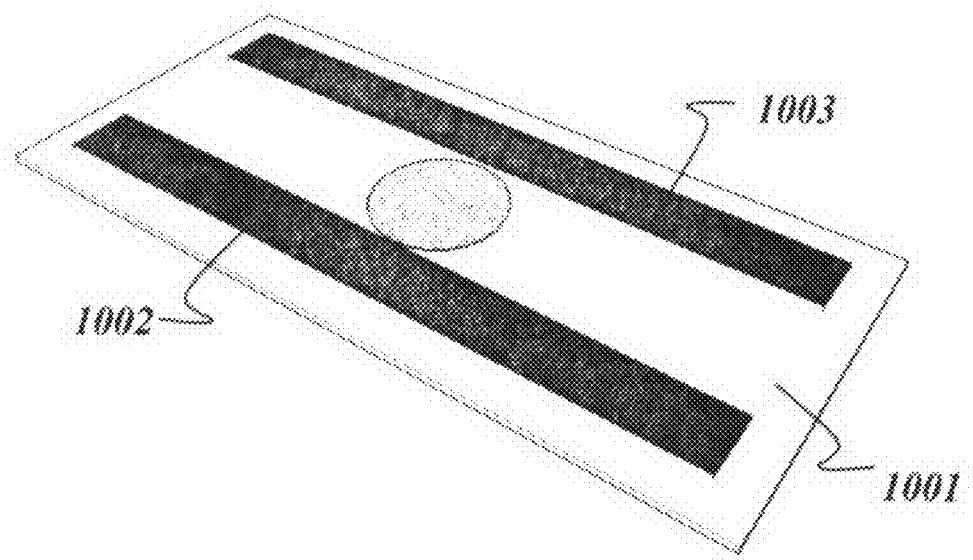
FIGS. 12($a$) and 12($b$) are perspective views showing an electrified highway roadway array.
Figure 12B:
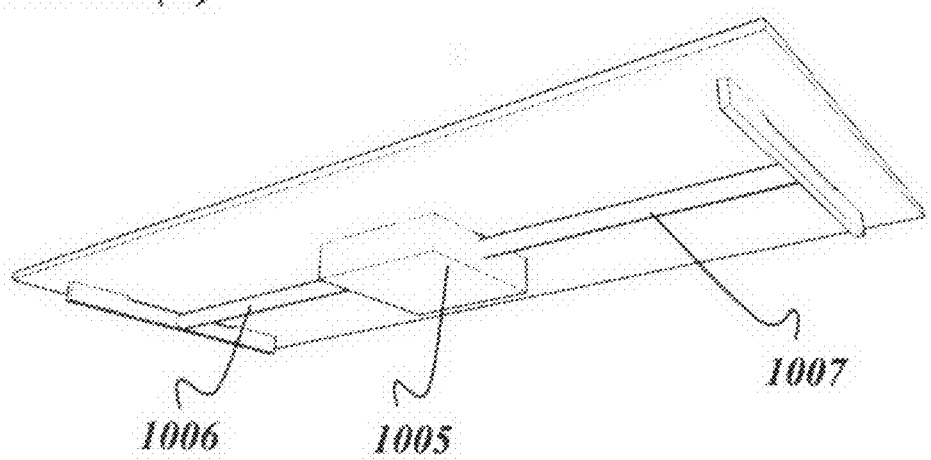

The roadway pad is shown in FIGS. 12(*a*) and 12(*b*). The roadway pad can comprise a ferrite magnetic core 1001, the two coils 1002 and 1003, and the Dual-Phase Inverter 1005. The coaxial returns 1006 and 1007 connect the coils to the converter.

Figure 13:
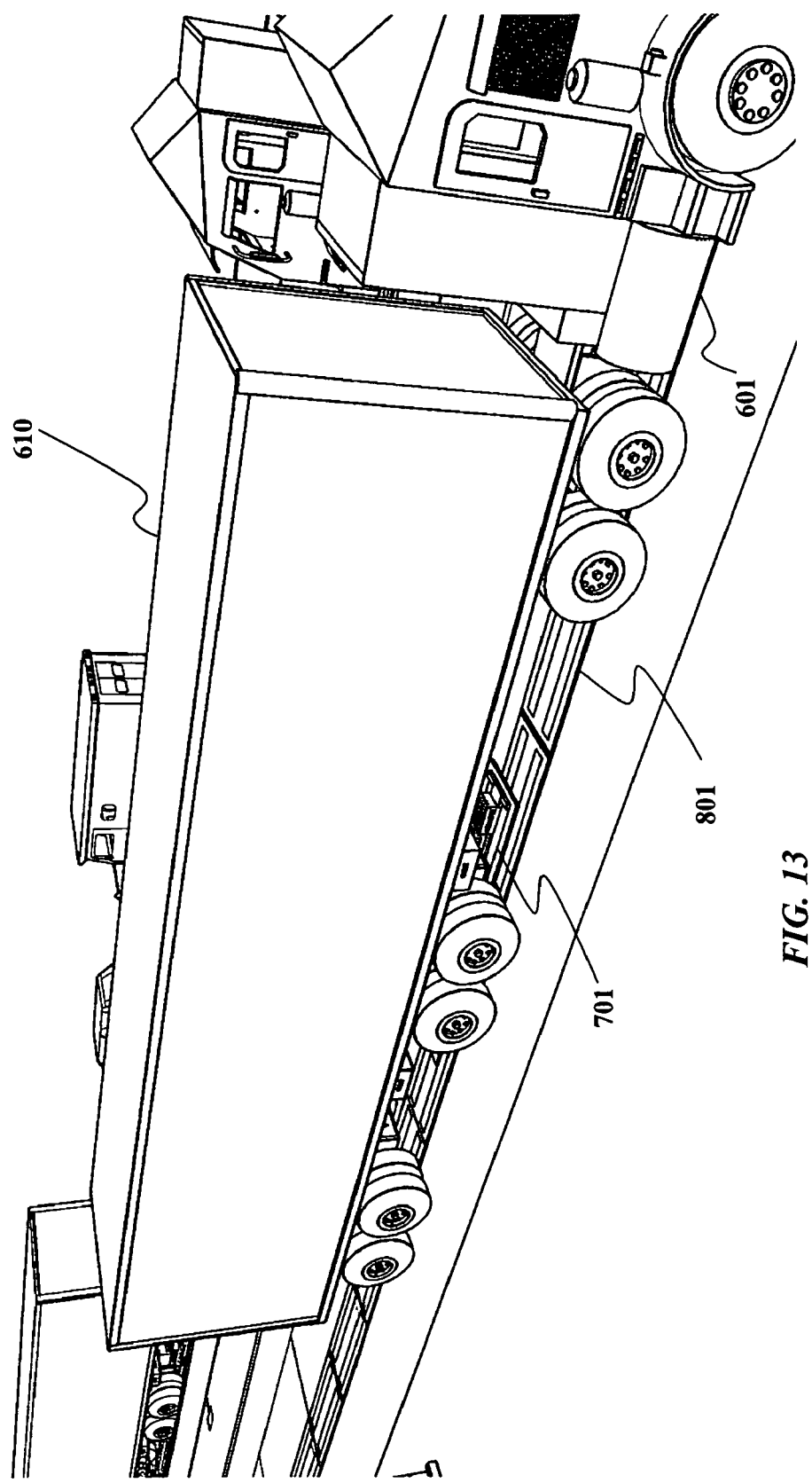
FIG. 13 is a diagram showing a cargo truck operating on an electrified highway.

The roadway pads can be lined up in the middle of a highway lane such that the vehicles activate the pads as they pass over them. Otherwise the pads are deactivated. FIG. 13 shows one example of an Electrified Highway Lane using the pads of FIG. 12. Vehicle 601—a cargo truck—passes over the row of roadway pads 801, and the attachable E-Pod 701 collects the energy from the activated pads.

Figure 14:
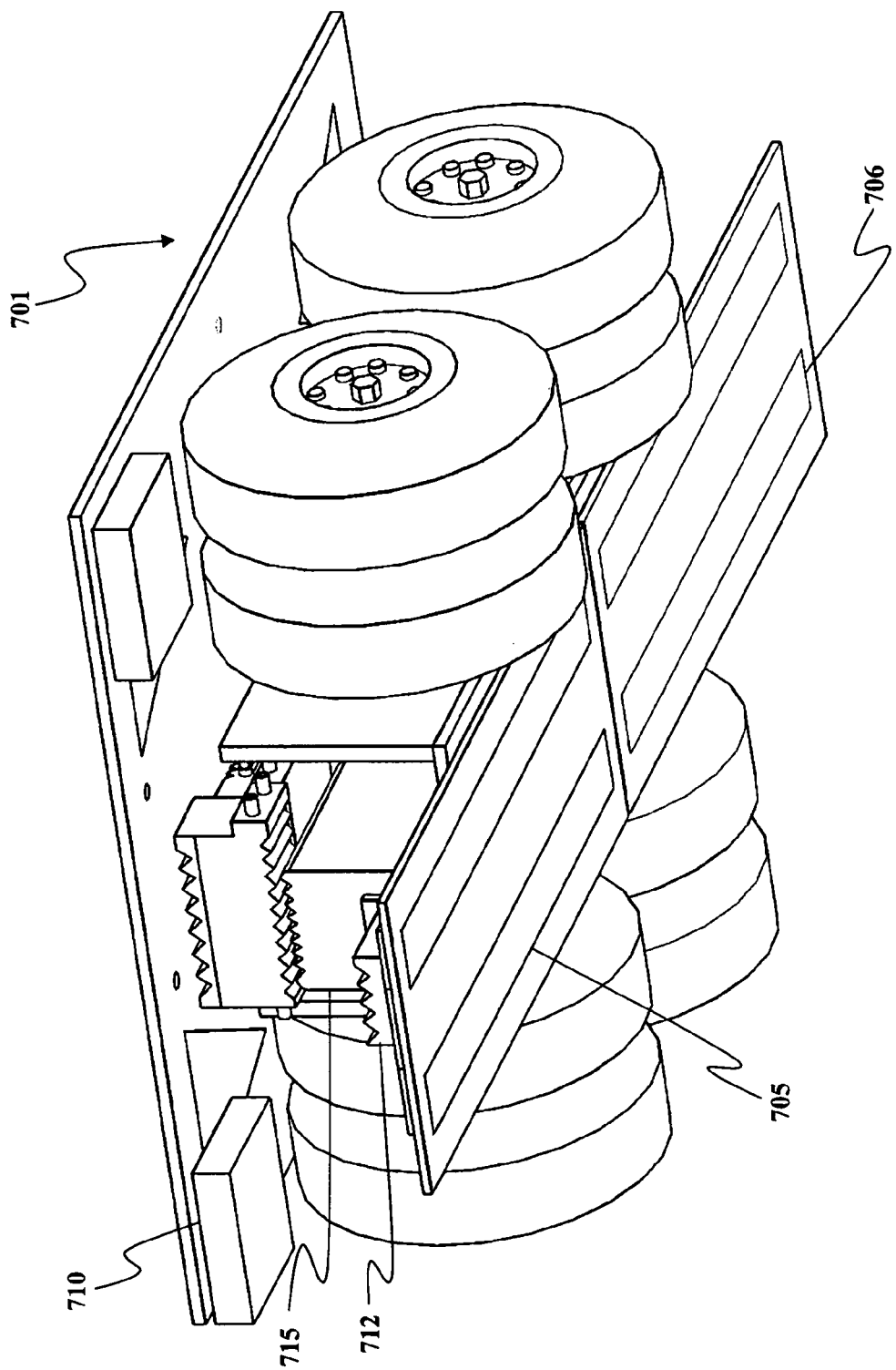
FIG. 14 is a perspective view showing an E-pod.

The E-Pod shown in FIG. 14 is one embodiment of an attachable wireless energy transfer module for large vehicles, which has the effect of converting the diesel vehicle into a hybrid-electric vehicle due to the attached E-pod. The E-Pod of FIG. 14 comprises the pickup coils 705 and 706, the HF rectifiers 712, battery packs 710 and the electric motor drive 715. This E-Pod has two sets of these components driving the front and back wheels separately. Other variations are also possible.

Figure 15:
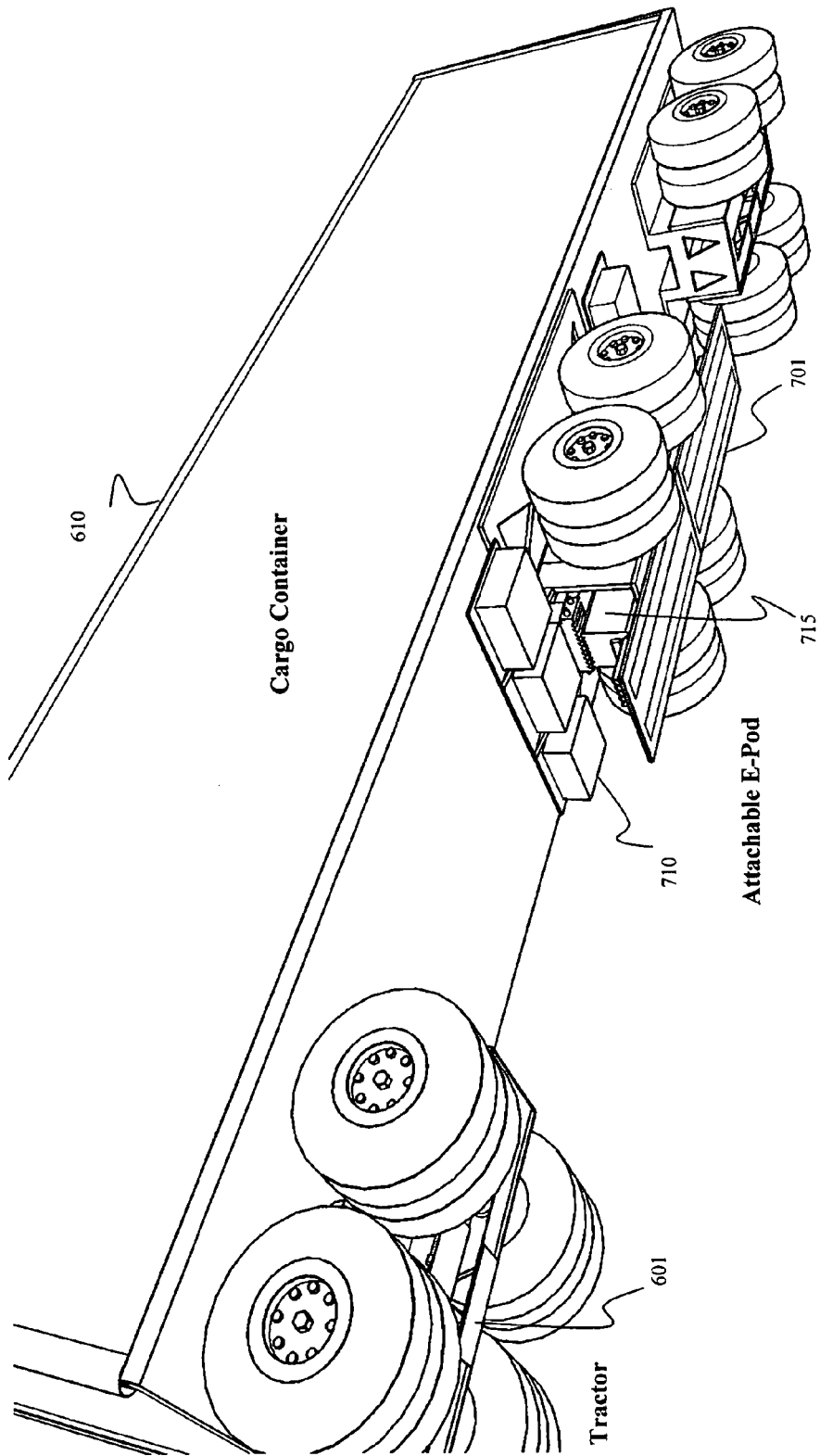
FIG. 15 is a perspective view illustrating an E-pod attached to a cargo truck.

In this cargo truck embodiment, the E-Pod 701 can be rolled under and installed to the bottom frame of the cargo container section 610 (shown in FIG. 13). FIG. 15 shows the E-Pod 701 installation under the cargo truck 601. The electronic interface to the driver can be plugged in so that the Rig is operating in dual-mode. When the vehicle travels over an electrified section of the highway, the E-Pod can be hydraulically lowered so that the wheels contact the roadway surface, and the electric drives can be activated to take over most of the propulsion power from the diesel tractor. During braking, the regenerated power can be fed back to the E-Pod batteries.

Preferably, the electrified lanes of the highway align the Wireless Energy Transfer roadway assemblies such that the dual coil pickup assemblies hover over the activated segments of the roadway. Thus, full power transfer can be spread over a longer distance-such as 16' to 24'-under the E-Pod. Through sequential activation, the power availability wave remains just under the E-Pod at all times, while the other segments under the Rig and on the highway idle preferably without power.

The power system feeding an Electrified Highway Lane can include a set of stationary Solid Oxide Fuel Cells (SOFC units) fed by alternative fuel sources, and a network of interconnecting microgrids described in a previous embodiment. Thus, the Electrified Highway Lane can have its own distributed energy generation system with combined heat capture and optional roadside Hydrogen generation. Where utility power is available, inexpensive, and environmentally acceptable, the microgrid can tap into the utility grid system.

The E-Pod shown in this embodiment uses cargo trucks for illustrative purposes only. Other types of vehicles, such as buses and utility vehicles can also be fitted with an E-pod, and can similarly use the Electrified Highway lanes for electric propulsion.

Figure 16:
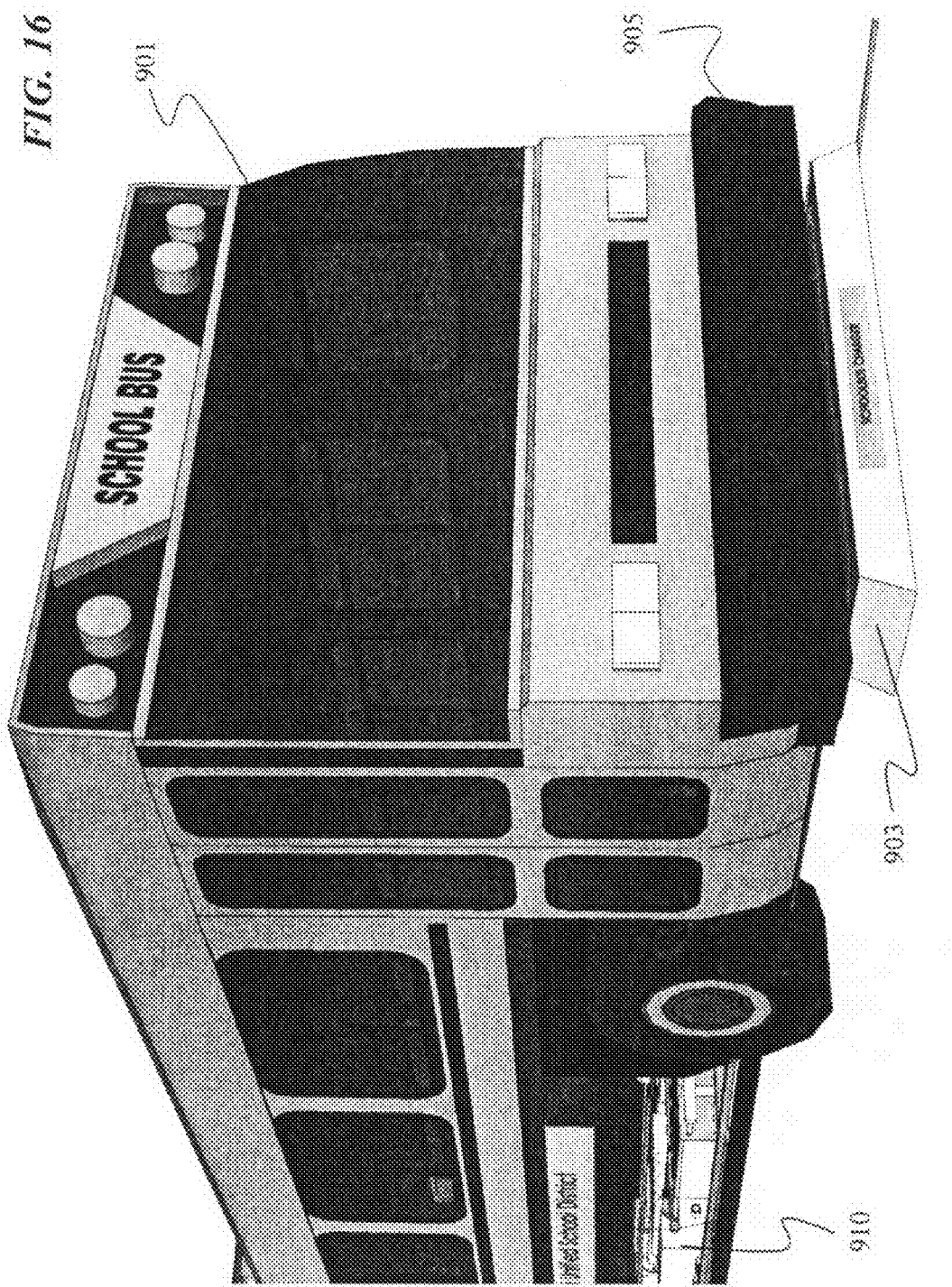
FIG. 16 is a perspective view showing a Bumper-Charger mounted to a bus.

In another embodiment of the high power wireless resonant energy transfer system, electric or hybrid vehicles that are regularly parked on the same location for extended period, such as school buses and passenger cars, can use Bumper Chargers with Wireless Energy Transfer ("WET") for replenishing their onboard energy storage. FIG. 16 shows a school bus 901 being recharged from an elevated Bumper Charger. The coils of the WET can be installed in the bumper 905 of the vehicle, and on the parkway in the bumper curb 903. The vehicle energy storage 910 can be recharged over a few hours while the school bus is waiting. The required power is small because of the long charging time available.

Figure 17:
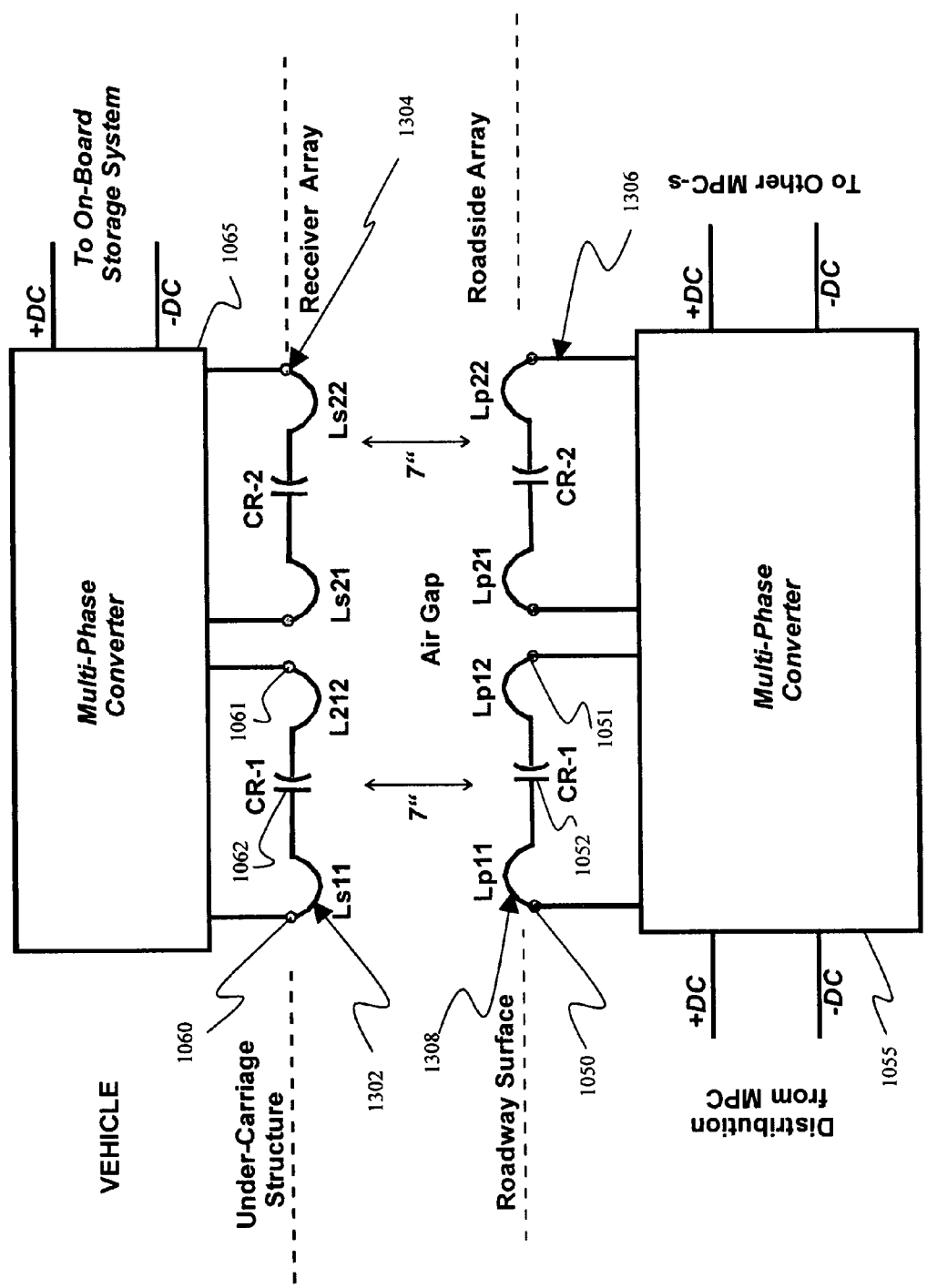
FIG. 17 is a schematic diagram showing a co-resonant inductive array circuit equivalent.

Hybrid and electric automobiles can use the WET installed in parking lots and home driveways. An average automobile can require about 0.3 kWh/ml for regular city cycles. Therefore, the recharge power requirements can be modest in comparison the buses and trucks (preferably 2.5 kWh/ml and 4 kWh/ml respectively). A medium power alternative of the series resonant inductive coupling array can be used to recharge power typically in the range of 5 to 15 kW. The principle block diagram in FIG. 17 shows the co-resonant inductively coupled phase-array technique, whose secondary receiving circuits 1302 and 1304 are tuned to the same frequency as the primary circuits 1308 and 1306. Although the primary circuits are weakly coupled to the secondary circuits, the high quality factor (Q) of the resonant circuits assures co-resonance at a common frequency. The operating resonant frequency can be over 100 kHz. The tuned circuit comprises split coils 1050 and 1051 (Lp11 and Lp12) resonating with the coaxial capacitor 1052, which is arranged near the middle of the LRC circuit as shown in FIG. 17. The receiving secondary resonant circuit comprises inductors 1060 and 1061 arranged as shown with capacitor 1062. The second pair of primary-secondary circuits 1306 and 1304, are substantially identical. The coils preferably have an air-core, with ferrite diverters preferably used only externally to shield residual flux entering the vehicle. The Multi-Phase Converters 1055 and 1065 can be integrated with the dual coil-capacitor field generators as shown in FIG. 14. As described in a previous embodiment, controlling the driving voltage phase angle between the primaries generates field direction change for power optimization that compensates for vehicle misalignment by shifting the location of the transfer.

Figure 18A:
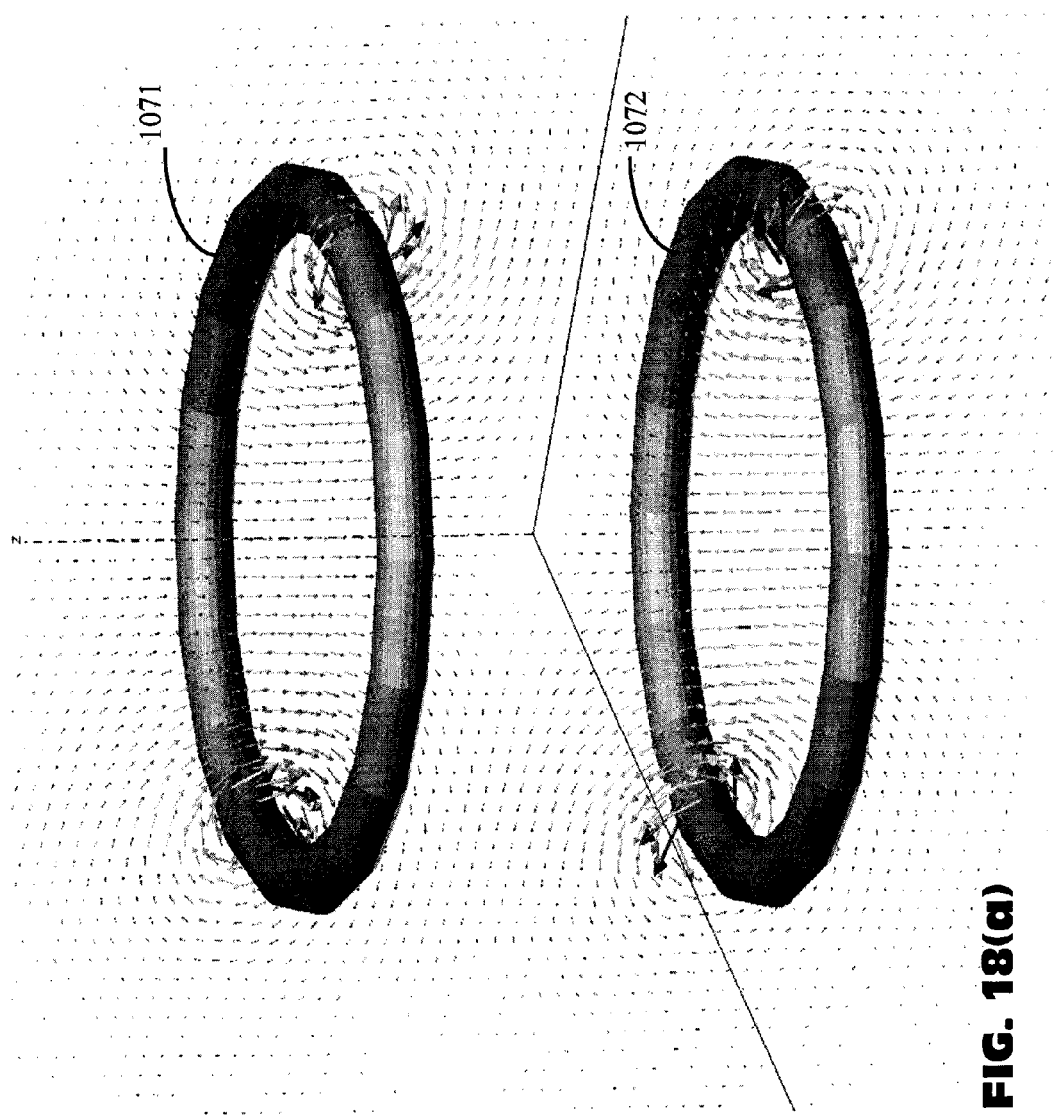
FIG. 18($a$) is a graph illustration showing the magnetic field strength of a co-resonant array.

FIG. 18(a) shows one example of a B-vector field distribution in a pair of primary-secondary coils. The co-resonating primary and secondary B fields 1071 and 1072 are dense in and around the coils, but the flux density is small in the airgap between the roadside assembly and the vehicle.

Figure 18B:
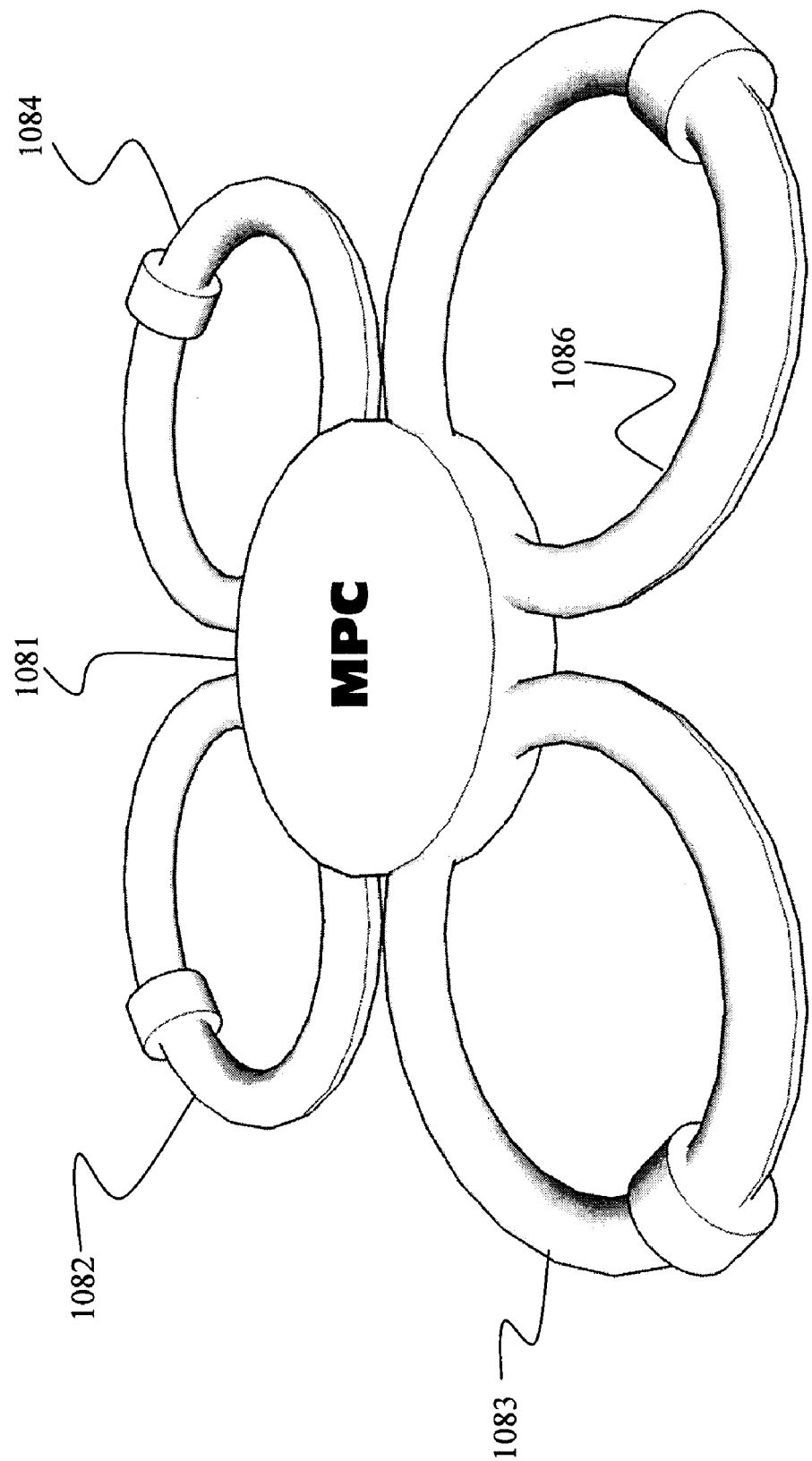

Corresponding to FIG. 9, which shows the extended double dual-coil configuration for the series-resonant inductive coupling for large vehicles, FIG. 18(b) shows the equivalent four coil configuration of the co-resonant inductive coupling for smaller vehicles.

Figure 19:
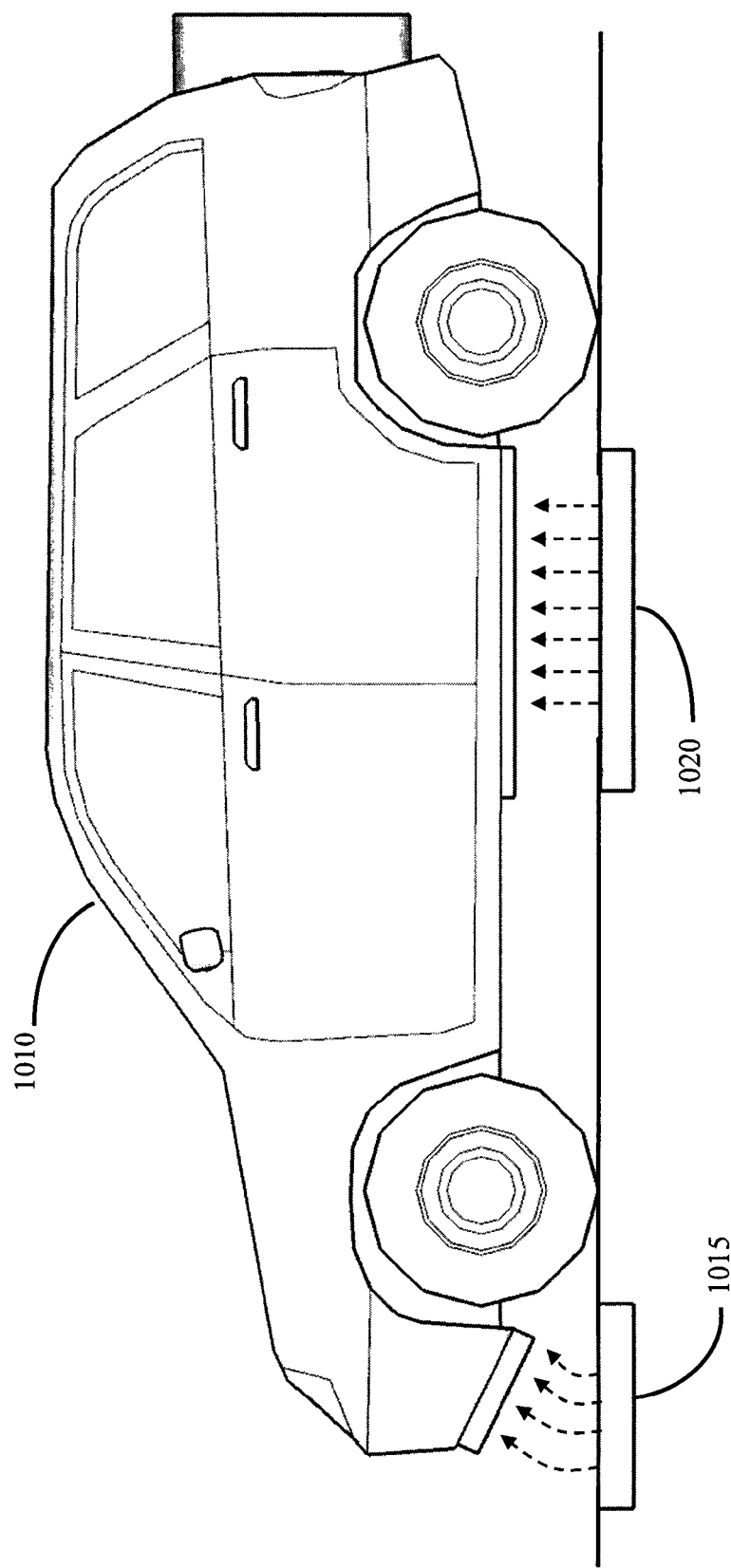
FIG. 19 is a perspective view of a vehicle using a co-resonant energy transmission system.

FIG. 19 shows a typical automobile 1010 which, once electrified, can use the co-resonant inductive WET installed into driveways and parking lots. WET installation under the roadway surface preferably uses the double dual-coil phase-array 1020, which can adjust and correct for large misalignment as described earlier. The curb-charger variation of the WET 1015 has adjustment for one direction. Due to the symmetry between the roadside and onboard power conversion, the energy can flow in both directions. Charging from the roadside can be reversed, and the energy stored in the onboard energy storage can be fed back to the roadside. The vehicle parked over the WET can be used as a non-contact emergency power source.

While various implementations and embodiments of the high power wireless resonant energy transfer system have been described, it will be apparent to those of ordinary skill in the art that many more are possible.

What is claimed is:

1. A high power wireless resonant energy transfer system, comprising:
   an energy transmission system arranged to wirelessly transfer energy across an airgap, wherein said energy transmission system comprises at least one pair of primary resonant circuits, each one of said at least one pair arranged to inductively couple with another of said at least one pair by an inductive coupling to establish a common resonant frequency for said at least one pair of primary resonant circuits; and
   an energy reception system positioned to receive said transferred energy across said airgap through a resonant inductive coupling between said transmission and said reception system, said energy transmission system arranged to automatically and electronically vary the spatial direction of said resonant inductive coupling with the alignment between said transmission and reception system, such that energy transfer occurs at a desired location, frequency and power level.

2. The system of claim 1, wherein said energy reception system comprises at least one pair of secondary coils arranged to inductively couple with said at least one pair of primary resonant circuits to provide an electrical load for said primary resonant circuits, said electrical load adjusting said common resonant frequency of said coupled primary and secondary circuits.

3. The system of claim 1, further comprising a controller that adjusts relative input voltage phase in said at least one pair of primary resonant circuits, said controller connected to receive an input voltage having an automatically adjustable input voltage phase to adjust said spatial direction of said resonant inductive coupling.

4. The system of claim 1, further comprising a controller that adjusts a pulse width of an input current to each of said at least one pair of primary resonant circuits to adjust the output power of said resonant inductive coupling.

5. The system of claim 1, wherein said desirable location is centered along a centerline of said receiver, and does not extend substantially beyond the limits of said receiver.

6. The system of claim 1, wherein said energy transmission system is arranged in proximity to a roadway and said energy reception system is arranged on an underside of an electrically chargeable vehicle.

7. The system of claim 6, wherein a plurality of said energy transmission systems are arranged in proximity to said roadway such that said electrically chargeable vehicle receives said transferred energy while in motion.

8. The system of claim 7, wherein said at least one pair of primary coils and said at least one pair of secondary coils comprise Litz-wire.

9. The system of claim 1, wherein said energy transmission system comprises at least one pair of primary coils, with the coils of each pair arranged in a ferrite core magnetic diverter and substantially coplanar with each other.

10. The system of claim 1, wherein said energy transmission system comprises at least one pair of secondary coils, with the coils of each pair arranged in a ferrite core magnetic diverter and substantially coplanar with each other.

11. A combined heat and power generation and high power wireless resonant energy transfer system, comprising:
   a local energy generation system arranged to generate, store and provide electrical energy for a local site and for an electrically chargeable vehicle in proximity to said local site;
   an energy transmission system arranged to wirelessly transfer energy across an airgap, wherein said energy transmission system comprises at least one pair of primary coils arranged to form a common resonant circuit, with the coils of each pair arranged to inductively couple to establish a common resonant frequency for said at least one pair of primary resonant circuits; and
   an energy reception system positioned to receive said transferred energy across said airgap through a resonant inductive coupling between said transmission and said reception systems, said energy transmission system arranged to automatically and electronically vary the spatial direction of said resonant inductive coupling with the alignment between said transmission and reception system, such that energy transfer occurs at a desired location, frequency and power level.

12. The system of claim 11, wherein said energy reception system comprises at least one pair of secondary coils arranged to inductively couple with said at least one pair of primary resonant circuits to provide an electrical load for said primary resonant circuits, said electrical load adjusting said common resonant frequency of said primary resonant circuits.

13. The system of claim 11, further comprising a controller that adjusts relative input voltage phase in said at least one pair of primary resonant circuits, said controller connected to receive an input voltage having an automatically adjustable input voltage phase to adjust said spatial direction of said resonant inductive coupling.

14. The system of claim 11, further comprising a controller that adjusts a pulse width of an input current to each of said at least one pair of primary resonant circuits to adjust the output power of said resonant inductive coupling.

15. The system of claim 11, wherein said desirable location is centered along a centerline of said receiver, and does not extend substantially beyond the limits of said receiver.

16. The system of claim 11, wherein said energy transmission system is arranged in proximity to a roadway and said energy reception system is arranged on an underside of an electrically chargeable vehicle.

17. The system of claim 16, wherein a plurality of said energy transmission systems are arranged in proximity to said roadway such that said electrically chargeable vehicle receives said transferred energy while in motion.

18. The system of claim 11, wherein said energy generation system comprises a generator and an alternative and renewable energy source for fueling said generator.

19. The system of claim 11, wherein said energy generation system comprises a multi-directional converter for controlling said electrical energy provided to said local site and said electrically chargeable vehicle.

20. An energy transfer system comprising:
   a power transmission system, comprising:
      first and second primary resonant circuits arranged co-planar with respect to each other within a primary magnetic assembly, each of said first and second primary resonant circuits comprising a primary coil, wherein said first and second primary resonant circuits arranged to inductively couple with each other to establish a common primary resonant inductive coupling frequency for said first and second primary resonant circuits;
      first and second independently controlled AC power sources electrically connected to said first and second primary resonant circuits to generate first and second primary currents, respectively, having a matching polarity along a primary center axis of the said primary magnetic assembly, said first and second primary currents having a controllable relative phase-angle between them and arranged to concentrate an energy density substantially along said primary center axis;
   a power reception system, comprising:
      first and second secondary resonant circuits arranged co-planar with respect to each other within a secondary magnetic assembly, each of said first and second secondary resonant circuits comprising a secondary coil, wherein said first and second secondary resonant circuits positioned to establish an inductive couple with and provide a secondary circuit electrical load to said first and second primary resonant circuits to establish an energy transfer system resonant frequency and provide a wireless high-power energy transfer from said power transmission system across an air-gap in proximity of said power transmission system; and
   a power vector-direction regulator electrically connected to said power transmission system comprising:
      a power level regulator;
      a frequency and primary zero-current crossing synchronization lock circuit for unity input power-factor electrically connected to said power level regulator; and
      a relative phase-displacement controller electrically connected to said lock circuit and arranged to regulate said first and second AC power sources for adjusting any misalignment between said primary and said secondary resonant circuits.

21. The system of claim 20, wherein said wireless high-power energy transfer is between 5 kW and 150 kW of power to transfer from transferring 10 kWh to 100 kWh of energy between said power transmission and reception system.

22. The system of claim 20, wherein said airgap between said primary and secondary coil-core assemblies is from 7 cm to 18 cm (~3" to ~7").

23. The system of claim 20, further comprising a vehicle on a surface, wherein said power transmission system is disposed under said surface and said energy reception system is arranged on an underside of said vehicle, said wireless high-power energy transfer occurring from said surface to said vehicle.

24. The system of claim 23, further comprising a plurality of said power transmission systems arranged under said surface and having a spacing between each of said plurality of said power transmission systems sufficient to provide a continuous power transmission to a moving vehicle passing over said surface, each of said plurality arranged to be activated sequentially when said moving vehicle passes over a respective one of said plurality of said power transmission systems.

25. The system of claim 23, wherein said vehicle is electric.

26. The system of claim 23, wherein said vehicle is a hybrid-electric propulsion vehicle.

27. The system of claim 23, wherein said vehicle is a cargo vehicle.

28. The system of claim 23, wherein said vehicle is one of the set comprising an electric locomotive, a magnetically levitated train, or a mobile platform.

29. The system of claim 20, further comprising first and second switchmode DC to AC inverters electrically connected to said first and second primary resonant circuits, respectively, and are arranged to control a power level of said energy transfer by regulation of an input DC voltage and a pulse-width, and having a switching frequency equal to said common primary resonant inductive coupling frequency using a primary current zero crossing synchronization.

30. The system of claim 29, wherein said first and second switchmode DC to AC inverters have an operational frequency between 17 kHz and 35 kHz.

31. The system of claim 29, wherein a first and second output voltage of said first and second switchmode DC to AC inverters have a phase-displacement established by said power vector-direction regulator to correct for uneven energy distribution in said air-gap due to any misalignment.

32. The system of claim 20, wherein said power vector-direction regulator is arranged to independently power a plurality of loads connected to said power reception system.

33. The system of claim 20, said power reception system further comprising a secondary energy storage system electrically connected to said first and second secondary resonant circuits.

34. The system of claim 33, wherein said secondary energy storage systems comprises a battery, a capacitor bank or a flywheel.

35. The system of claim 20, wherein said power vector-direction regulator further comprises an onboard reverse power-flow controller for transferring stored energy from said power reception system to said power transmission system.

36. The system of claim 20, further comprising a high efficiency local combined cooling, heating and power (CCHP) generation, storage and distribution system arranged to generate, store and distribute electrical energy locally to said energy transfer system, and to receive, store and distribute regenerated energy from said secondary energy storage system.

37. The system of claim 36, wherein said reverse power-flow controller is arranged to transfer said stored energy from said power reception system to said first and second primary resonant circuits to provide a portable back-up power for said (CCHP) during station power failure.

38. The system of claim 36, wherein said local energy generation system comprises one or more renewable energy sources and is electrically connected to said energy transfer system, to a host facility for providing heat and electricity, and to a utility grid for load leveling.

39. A method for wireless energy transfer, comprising:
positioning an electrically chargeable vehicle comprising a power reception system within electromagnetic proximity of one or more high-power energy transfer transmitters of a power transmission system;
synchronizing DC to AC inverters of said power transmission system at low power to a power transmission frequency and phase at which a primary current zero-crossing coincides with the inverter voltage zero-crossing;
establishing input unity power factor, maximum real power transmission and low switching losses at an operating switching frequency range of 17-30 kHz;
modulating a relative phase angle between said DC to AC inverters and a power vector-direction regulator to optimize energy distribution within an airgap between said power transmission and reception system to correct vehicle-transmitter misalignments; and
regulating said wireless energy transfer to full power (10 kW-150 kW) based on the charge state or propulsion requirements of said vehicle by controlling the input DC voltage level or by modulating the synchronized pulse width of the said DC to AC inverters.

40. The method of claim 39, further comprising reversing energy flow from a vehicle energy storage system to a local stationary energy storage system in a standby power source mode or in a regenerative braking mode in case of moving vehicles.

* * * * *